US009773333B2

(12) United States Patent
Hanai

(10) Patent No.: US 9,773,333 B2
(45) Date of Patent: Sep. 26, 2017

(54) INFORMATION PROCESSING DEVICE, INFORMATION PROCESSING METHOD, AND PROGRAM

(71) Applicant: Sony Corporation, Tokyo (JP)

(72) Inventor: Yuya Hanai, Tokyo (JP)

(73) Assignee: Sony Corporation (JP)

( * ) Notice: Subject to any disclaimer, the term of this patent is extended or adjusted under 35 U.S.C. 154(b) by 316 days.

(21) Appl. No.: 14/405,300

(22) PCT Filed: Apr. 24, 2013

(86) PCT No.: PCT/JP2013/061995
§ 371 (c)(1),
(2) Date: Dec. 3, 2014

(87) PCT Pub. No.: WO2013/187129
PCT Pub. Date: Dec. 19, 2013

(65) Prior Publication Data
US 2015/0145889 A1 May 28, 2015

(30) Foreign Application Priority Data
Jun. 12, 2012 (JP) ................. 2012-133319

(51) Int. Cl.
*G06T 11/60* (2006.01)
*G06T 3/60* (2006.01)
(Continued)

(52) U.S. Cl.
CPC ............... *G06T 11/60* (2013.01); *G06T 3/60* (2013.01); *G09G 5/377* (2013.01);
(Continued)

(58) Field of Classification Search
None
See application file for complete search history.

(56) References Cited

U.S. PATENT DOCUMENTS

2002/0061131 A1* 5/2002 Sawhney ............ G06T 7/0022
382/154
2002/0128018 A1* 9/2002 Bybee ................. H04B 7/2041
455/456.6
(Continued)

FOREIGN PATENT DOCUMENTS

| JP | 2007-172621 A | 7/2007 |
|---|---|---|
| JP | 2010-191607 A | 9/2010 |
| JP | 2012-058838 A | 3/2012 |
| JP | 2012-108842 A | 6/2012 |
| WO | 2011-036761 A1 | 3/2011 |

OTHER PUBLICATIONS

International Search Report from International Publication PCT/JP2013/061995 mailed May 28, 2013.

*Primary Examiner* — Saptarshi Mazumder
(74) *Attorney, Agent, or Firm* — Lerner, David, Littenberg, Krumholz & Mentlik, LLP

(57) ABSTRACT

There is provided an information processing device including an acquisition section configured to acquire space position information of a terminal including a display section that displays an image in which a virtual image is superimposed on a captured image acquired by an imaging section, and a specifying section configured to specify display information for displaying the virtual image on the display section according to the space position information of the terminal.

7 Claims, 23 Drawing Sheets

(51) Int. Cl.

| | |
|---|---|
| *H04N 5/262* | (2006.01) |
| *G09G 5/377* | (2006.01) |
| *H04N 21/414* | (2011.01) |
| *H04N 21/422* | (2011.01) |
| *H04N 21/4223* | (2011.01) |
| *H04N 21/43* | (2011.01) |
| *H04N 21/6587* | (2011.01) |
| *H04N 5/232* | (2006.01) |

(52) U.S. Cl.
CPC ..... *H04N 5/2621* (2013.01); *H04N 21/41407* (2013.01); *H04N 21/4223* (2013.01); *H04N 21/42202* (2013.01); *H04N 21/4307* (2013.01); *H04N 21/6587* (2013.01); *G09G 2350/00* (2013.01); *G09G 2370/022* (2013.01); *G09G 2370/04* (2013.01); *H04N 5/23293* (2013.01)

(56) References Cited

U.S. PATENT DOCUMENTS

| | | | |
|---|---|---|---|
| 2007/0146391 A1 | 6/2007 | Pentenrieder et al. | |
| 2008/0109865 A1* | 5/2008 | Su | H04N 21/234363 725/116 |
| 2011/0187744 A1* | 8/2011 | Kim | H04M 1/72572 345/633 |
| 2011/0275415 A1* | 11/2011 | Lee | G06F 1/1686 455/566 |
| 2012/0056898 A1 | 3/2012 | Tsurumi et al. | |
| 2012/0086822 A1* | 4/2012 | Ishii | H04N 5/23258 348/208.6 |
| 2012/0170833 A1 | 7/2012 | Kokojima et al. | |

* cited by examiner

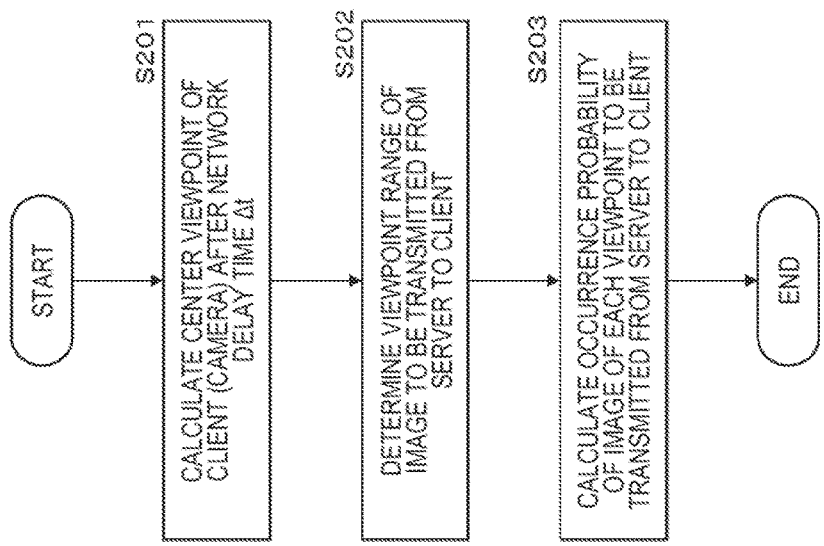

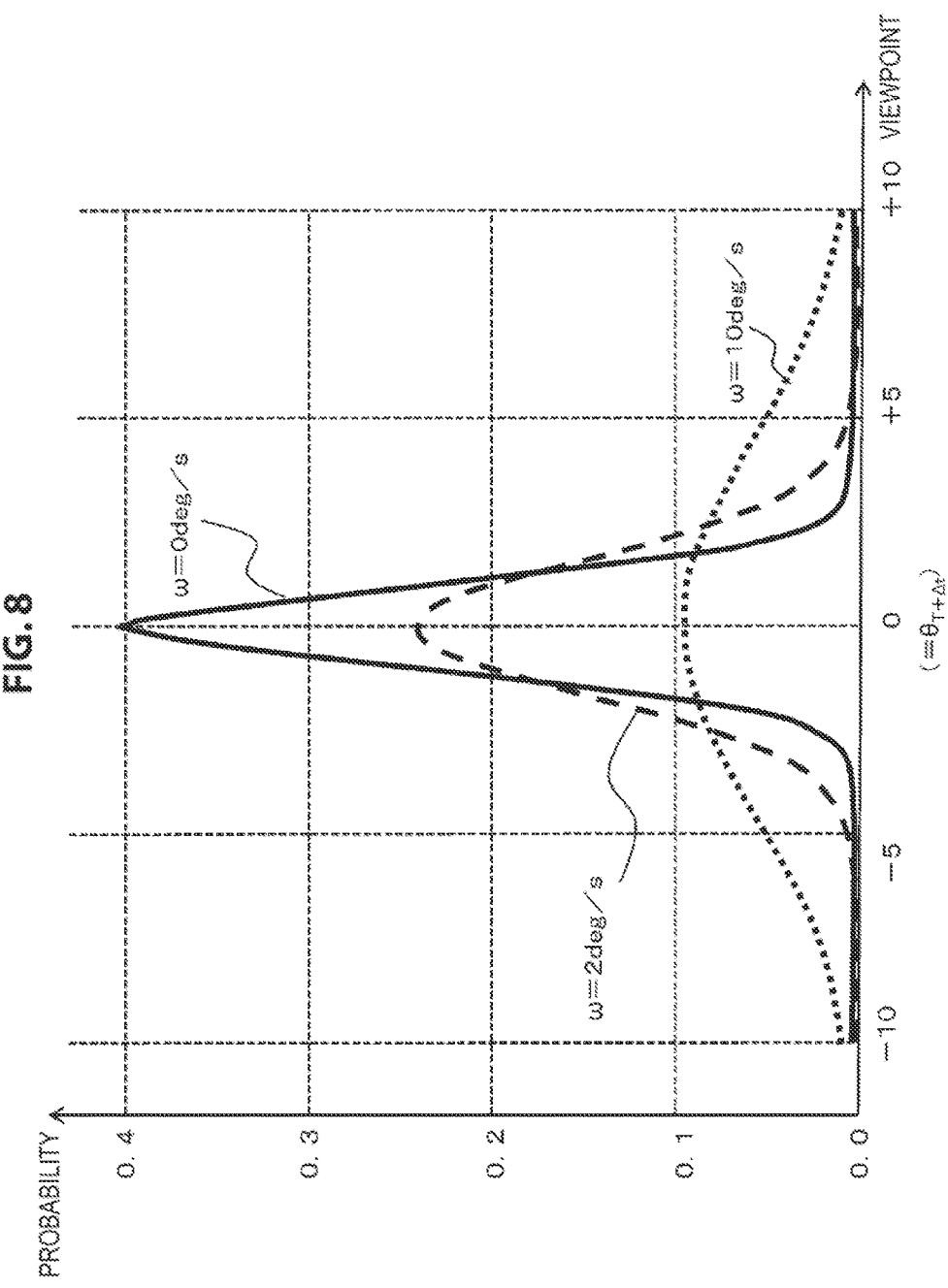

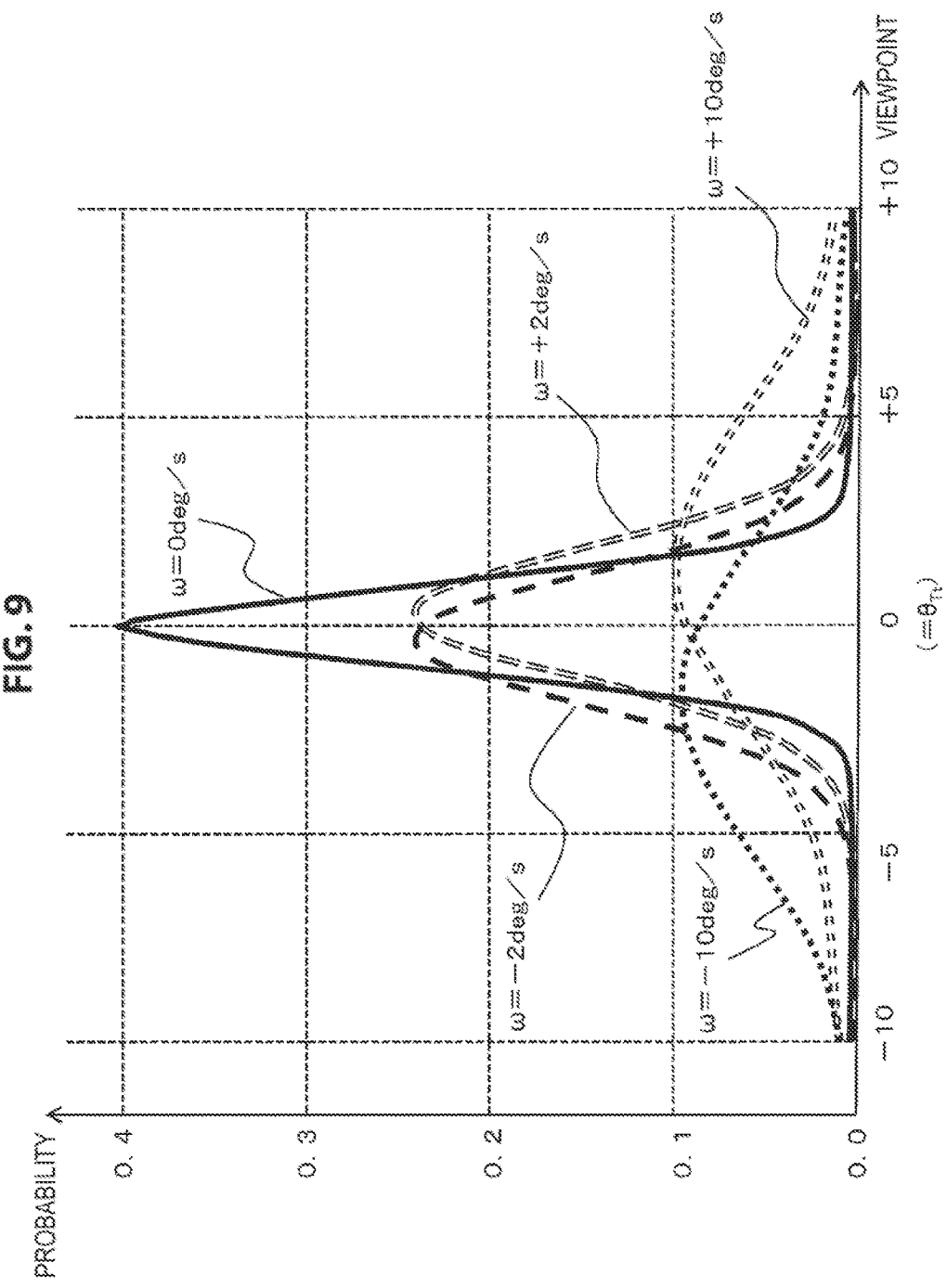

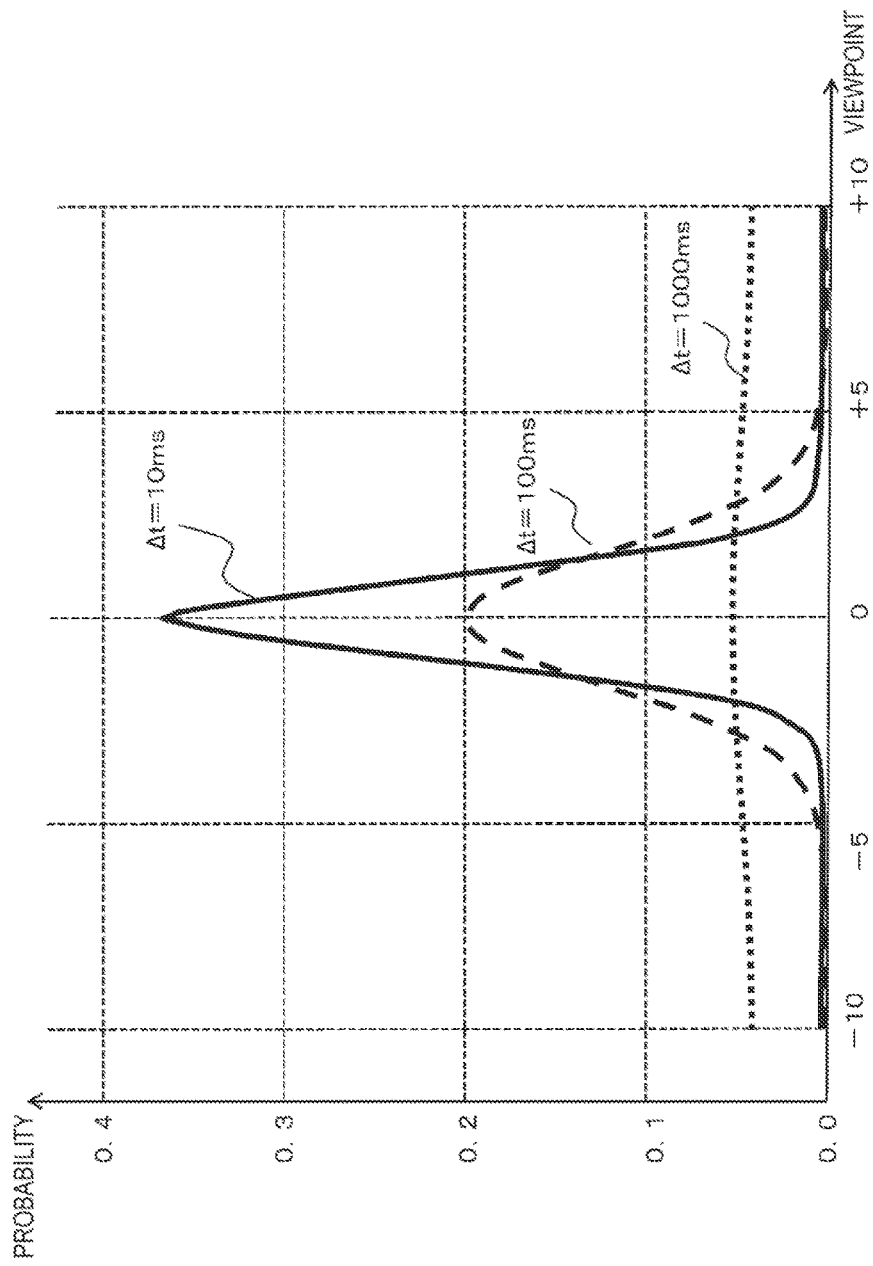

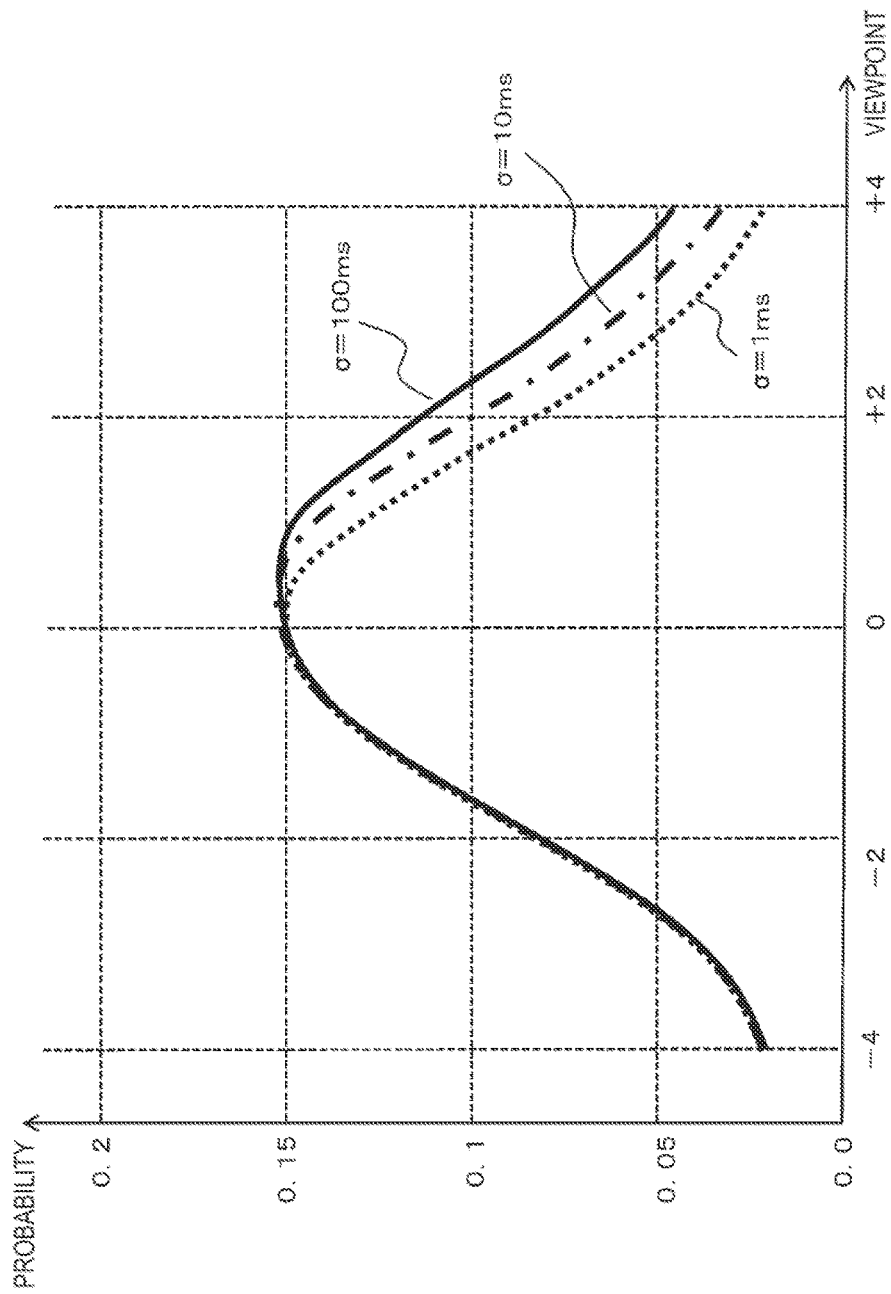

FIG. 12

| CONTENT | DETAILS OF CONTENT | PROBABILITY |
|---|---|---|
| (1) MOVING IMAGE CONTENT 1 (View1) | MOVING IMAGE CONTENT IN WHICH SUBJECT (FOR EXAMPLE, PERSON) CORRESPONDING TO VIRTUAL IMAGE IS CAPTURED FROM VIEWPOINT θT + Δt | 0.40 |
| (2) MOVING IMAGE CONTENT 2 (View2) | MOVING IMAGE CONTENT IN WHICH SUBJECT (FOR EXAMPLE, PERSON) CORRESPONDING TO VIRTUAL IMAGE IS CAPTURED FROM VIEWPOINT θT + Δt + k | 0.20 |
| (3) MOVING IMAGE CONTENT 3 (View3) | MOVING IMAGE CONTENT IN WHICH SUBJECT (FOR EXAMPLE, PERSON) CORRESPONDING TO VIRTUAL IMAGE IS CAPTURED FROM VIEWPOINT θT + Δt - k | 0.20 |
| (4) MOVING IMAGE CONTENT 4 (View4) | MOVING IMAGE CONTENT IN WHICH SUBJECT (FOR EXAMPLE, PERSON) CORRESPONDING TO VIRTUAL IMAGE IS CAPTURED FROM VIEWPOINT θT + Δt + 2k | 0.05 |
| (5) MOVING IMAGE CONTENT 5 (View5) | MOVING IMAGE CONTENT IN WHICH SUBJECT (FOR EXAMPLE, PERSON) CORRESPONDING TO VIRTUAL IMAGE IS CAPTURED FROM VIEWPOINT θT + Δt - 2k | 0.05 |
| ... | ... | ... |

INFORMATION PROCESSING DEVICE, INFORMATION PROCESSING METHOD, AND PROGRAM

CROSS-REFERENCE TO RELATED APPLICATION

The present application is a national phase entry under 35 U.S.C. §371 of International Application No. PCT/JP2013/061995 filed Apr. 24, 2013, published on Dec. 19, 2013 as WO 2013/187129 A1, which claims priority from Japanese Patent Application No. JP 2012-133319, filed in the Japanese Patent Office on Jun. 12, 2012.

TECHNICAL FIELD

The present disclosure relates to an information processing device, an information processing method, and a program. In particular, the present disclosure relates to an information processing device, an information processing method, and a program, which perform an augmented reality (AR) display.

BACKGROUND ART

For example, an image, in which a virtual image other than a captured image is superimposed on a captured image of a camera, is called an augmented reality (AR) image and has recently been used in various fields.

In particular, in recent years, portable terminals, such as a smartphone having a camera function and a display as well as a communication function, have been widespread, and applications that apply an AR image to such a smartphone are widely used.

As one example of use of the AR image, there are the following examples.

As an example of processing, when a certain object (subject) is captured by using a camera function of a portable terminal such as a smartphone, object information is transmitted to a server, and information related to the object is received from the server and is displayed on a display section of the smartphone together with a captured object.

Image information transmitted from the server to the smartphone is various. For example, there is an image of a virtual character related to a captured object, or a pre-captured person or landscape.

Incidentally, as an example of related art disclosing the generation and display processing of an AR image, there is Patent Literature 1 (JP 2012-58838A).

However, in a case where a virtual image to be transmitted from a server is a moving image in which a real person is captured, when the moving image is superimposedly displayed on a captured camera image of a portable terminal of a user, the captured image and the virtual image show different motions. Thus, the person as the virtual image is merely stuck on the captured image, and it does not look as if the person exists in the captured image.

This is a main cause that the live-action image captured using the portable terminal by the user is changed according to a change in the angle or the like of the portable terminal, whereas the virtual image provided by the server is moved regardless of the change in the angle or the like of the portable terminal.

In order to solve such problems, it seems effective to transmit a plurality of moving images captured from every angle from the server to the user terminal and selectively display an image according to the angle of the terminal at the user terminal side. However, if such processing is performed, a communication load or a load of a user terminal becomes enormous, and a communication delay or a processing delay is caused.

CITATION LIST

Patent Literature

Patent Literature 1: JP 2012-58838A

SUMMARY OF INVENTION

Technical Problem

The present disclosure has been made in view of, for example, the above problems, and provides an information processing device, an information processing method, and a program. According to the present disclosure, in a configuration that superimposedly displays a virtual image on a captured image captured by a camera of a portable terminal held by a user and displayed on a display section, the virtual image is changed according to the motion of the camera, so that an AR image can be displayed as if the virtual image exists in the captured image.

Solution to Problem

According to a first aspect of the present disclosure, there is provided an information processing device including:

an acquisition section configured to acquire space position information of a terminal including a display section that displays an image in which a virtual image is superimposed on a captured image acquired by an imaging section; and a specifying section configured to specify display information for displaying the virtual image on the display section according to the space position information of the terminal.

According to an embodiment of the present disclosure, the information processing device further includes an imaging section configured to capture an image, a display section configured to display a captured image of the imaging section, and a data processing section configured to receive the virtual image from a server and superimposedly display the received virtual image on the captured image displayed on the display section. The data processing section estimates the position of the imaging section after predetermined time according to motion information of the information processing device, transmits the estimated position information to the server, receives the virtual image captured from the estimated position or the depth map and the image for virtual image generation from the server, and displays the received image or the image generated based on the received image on the display section.

According to an embodiment of the present disclosure, the data processing section estimates the capturing direction of the imaging section after time $T+\Delta t$ considering network delay time $\Delta t$ that is round trip time of a communication with a server by applying position/orientation information of the imaging section and motion information at current time T, and transmits the estimated direction to the server as the estimated position information.

According to an embodiment of the present disclosure, the data processing section calculates probability of the capturing direction of the imaging section after time $T+\Delta t$ considering network delay time $\Delta t$ that is round trip time of a communication with a server by applying position/orientation information of the imaging section and motion information at current time T, selects an angle range of a range with high probability, and receives, form the server, virtual images of multiple viewpoints included in the selected angle range or the depth map and the image for virtual image generation.

According to an embodiment of the present disclosure, the data processing section receives, from the server, image data in which an image with a relatively high probability is set as a high-resolution image and an image with a relatively low probability is set as a low-resolution image in the selected angle range.

According to an embodiment of the present disclosure, when there is no great difference in the probability in the selected angle range, the data processing section receives, from the server, the virtual images of the multiple viewpoints included in the selected angle range as images having a same resolution.

According to an embodiment of the present disclosure, the data processing section selects a virtual image of a viewpoint close to the capturing direction of the imaging section at a display timing of the virtual image from the virtual images of the multiple viewpoints received from the server, or generates a virtual image captured from a viewpoint close to the capturing direction of the imaging section at the display timing of the virtual image by applying the depth map and the image for virtual image generation, and displays the virtual image on the display section.

According to a second aspect of the present disclosure, there is provided an information processing device as a server including:
a communication section configured to perform communication with a client; and
a data processing section configured to select and transmit a virtual image to be superimposedly displayed on a captured image of a client imaging section which is displayed on a display section of the client,
wherein the data processing section selects a virtual image captured from the position of the client capturing section after predetermined time estimated according to the motion information of the client or a depth map and an image for virtual image generation as data to be transmitted to the client, and transmits the selected virtual image or the depth map and the image to the client.

According to an embodiment of the present disclosure, the data processing section estimates the capturing direction of the client imaging section after time T+Δt considering network delay time Δt that is round trip time of a communication between the server and the client by applying position/orientation information of the client imaging section and motion information at current time T, and selects the virtual image captured in the estimated direction or the depth map and the image for virtual image generation as data to be transmitted to the client.

According to an embodiment of the present disclosure, the data processing section calculates probability of the capturing direction of the client imaging section after time T+Δt considering network delay time Δt that is round trip time of a communication between the server and the client by applying position/orientation information of the client imaging section and motion information at current time T, selects an angle range of a range with high probability, and selects the virtual images of the multiple viewpoints included in the selected angle range as data to be transmitted to the client.

According to an embodiment of the present disclosure, the data processing section generates image data to be transmitted in which an image with a relatively high probability is set as a high-resolution image and an image with a relatively low probability is set as a low-resolution image in the selected angle range, and transmits the image data to the client.

According to a third embodiment of the present disclosure, there is provided an information processing device including:
an imaging section configured to capture an image;
a display section configured to display a captured image of the imaging section;
a storage section configured to store virtual images corresponding to multiple viewpoints that are virtual images to be superimposedly displayed on a captured image displayed on the display section and are obtained by capturing an object from different multiple viewpoints; and
a data processing section configured to acquire the virtual image from the storage section and superimposedly display the acquired virtual image on the captured image displayed on the display section,
wherein the data processing section estimates the position of the imaging section after predetermined time according to motion information of the information processing device, and then selects the virtual image captured from the estimated position from the storage unit and displays the virtual image, or generates the virtual image based on the virtual image acquired from the storage section and displays the virtual image on the display section.

According to an embodiment of the present disclosure, the storage section stores the depth map and the virtual image corresponding to multiple viewpoints obtained by capturing an object from different multiple viewpoints, and
wherein the data processing section generates and displays the virtual image captured from the estimated position on the display section by applying the depth map and the virtual image acquired from the storage section.

According to an embodiment of the present disclosure, the data processing section calculates probability of the capturing direction of the imaging section after predetermined time according to motion information of the information processing device, selects a virtual image with a high probability from the storage section or generates a virtual image based on the virtual image acquired from the storage section, and displays the virtual image on the display section.

According to a fourth aspect of the present disclosure, an information processing method, which is performed by an information processing device,
wherein the information processing device includes:
a communication section configured to perform communication with a client; and
a data processing section configured to select and transmit a virtual image to be superimposedly displayed on a captured image of a client imaging section which is displayed on a display section of the client, and
wherein the data processing section selects a virtual image captured from the position of the client capturing section after predetermined time estimated according to the motion information of the client or a depth map and an image for virtual image generation as data to be transmitted to the client, and transmits the selected image to the client.

According to a fifth aspect of the present disclosure, an information processing method, which is performed by an information processing device,
wherein a data processing section acquires space position information of a terminal including a display section that displays an image in which a virtual image is superimposed on a captured image acquired by an imaging section, and wherein the data processing section specifies display information for displaying the virtual image on the display section according to the space position information of the terminal.

According to a sixth aspect of the present disclosure, an information processing method, which is performed by an information processing device, wherein the information processing device includes:
an imaging section configured to capture an image;
a display section configured to display a captured image of the imaging section;
a storage section configured to store virtual images corresponding to multiple viewpoints that are virtual images to be superimposedly displayed on a captured image displayed on the display section and that have a captured object from different multiple viewpoints; and
a data processing section configured to acquire the virtual image from the storage section and superimposedly display the acquired virtual image on the captured image displayed on the display section, wherein the data processing section estimates the position of the imaging section after predetermined time according to motion information of the information processing device, and then selects the virtual image captured from the estimated position from the storage section and displays the virtual image, or generates the virtual image based on the virtual image acquired from the storage section, and displays the virtual image on the display section.

According to a seventh aspect of the present disclosure, a program for causing an information processing device to execute information processing, wherein the information processing device includes:
a communication section configured to perform communication with a client; and
a data processing section configured to select and transmit a virtual image to be superimposedly displayed on a captured image of a client imaging section which is displayed on a display section of the client, wherein the program causes the data processing section to select a virtual image captured from the position of the client capturing section after predetermined time estimated according to the motion information of the client or a depth map and an image for virtual image generation as data to be transmitted to the client, and transmit the selected image to the client.

According to an eighth aspect of the present disclosure, a program for causing an information processing device to execute information processing of:

causing a data processing section to acquire space position information of a terminal including a display section that displays an image in which a virtual image is superimposed on a captured image captured by an imaging section; and causing the data processing section to specify display information for displaying the virtual image on the display section according to the space position information of the terminal.

According to a ninth aspect of the present disclosure, a program for causing an information processing device to execute information processing, wherein the information processing device includes:
an imaging section configured to capture an image;
a display section configured to display a captured image of the imaging section;
a storage section configured to store virtual images corresponding to multiple viewpoints that are virtual images to be superimposedly displayed on a captured image displayed on the display section and that have captured a object from different multiple viewpoints; and
a data processing section configured to acquire the virtual image from the storage section and superimposedly display the acquired virtual image on the captured image displayed on the display section, wherein the program causes the data processing section to estimate the position of the imaging section after predetermined time according to motion information of the information processing device, and then selects the virtual image captured from the estimated position from the storage section and displays the virtual image, or generates the virtual image based on the virtual image acquired from the storage section, and display the virtual image on the display section.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The object, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

Advantageous Effects of Invention

According to the configuration of one embodiment of the present disclosure, the virtual image, which is natural according to the capturing direction of the camera, can be superimposedly displayed on the captured camera image displayed on the display section.

Specifically, the configuration includes the server that transmits the virtual image to the client, and the client that superimposedly displays the captured camera image and the virtual image transmitted from the server. The server transmits, to the client, the virtual image captured from the client position after a predetermined time estimated according to the motion of the client (camera). In one of the server and the client, by applying the client position and orientation information at the current time T and the motion information, the capturing direction of the client after the time T+Δt considering the network delay time Δt that is the round trip time of communication between the server and the client is estimated, and the virtual image captured in the estimated direction is transmitted to the client.

According to such configurations, the virtual image, which is natural according to the capturing direction of the camera, can be superimposedly displayed on the captured camera image displayed on the display section of the client.

BRIEF DESCRIPTION OF DRAWINGS

FIG. 7 is a diagram illustrating a flowchart describing details of processing of estimating an angle of a client (camera) and determining a transmission image.

FIG. 8 is a diagram describing an example of information to be applied to processing of estimating an angle of a client (camera) and determining a transmission image.

FIG. 9 is a diagram describing an example of information to be applied to processing of estimating an angle of a client (camera) and determining a transmission image.

FIG. 10 is a diagram describing an example of information to be applied to processing of estimating an angle of a client (camera) and determining a transmission image.

FIG. 11 is a diagram describing an example of information to be applied to processing of estimating an angle of a client (camera) and determining a transmission image.

FIG. 12 is a diagram describing an example of information to be applied to processing of estimating an angle of a client (camera) and determining a transmission image.

DESCRIPTION OF EMBODIMENTS

Hereinafter, an information processing device, an information processing method, and a program according to the present disclosure will be described in detail with reference to the appended drawings. Note that description will be provided in the following order.

1. Overview of Processing of Present Disclosure
2. First Embodiment of Present Disclosure
3. Second Embodiment of Present Disclosure
4. Third Embodiment of Present Disclosure
5. Other Embodiments
6. Summary of Configuration of Present Disclosure 1. Overview of Processing of Present Disclosure First, the overview of processing of the present disclosure is described with reference to FIG. 1

Figure 1:
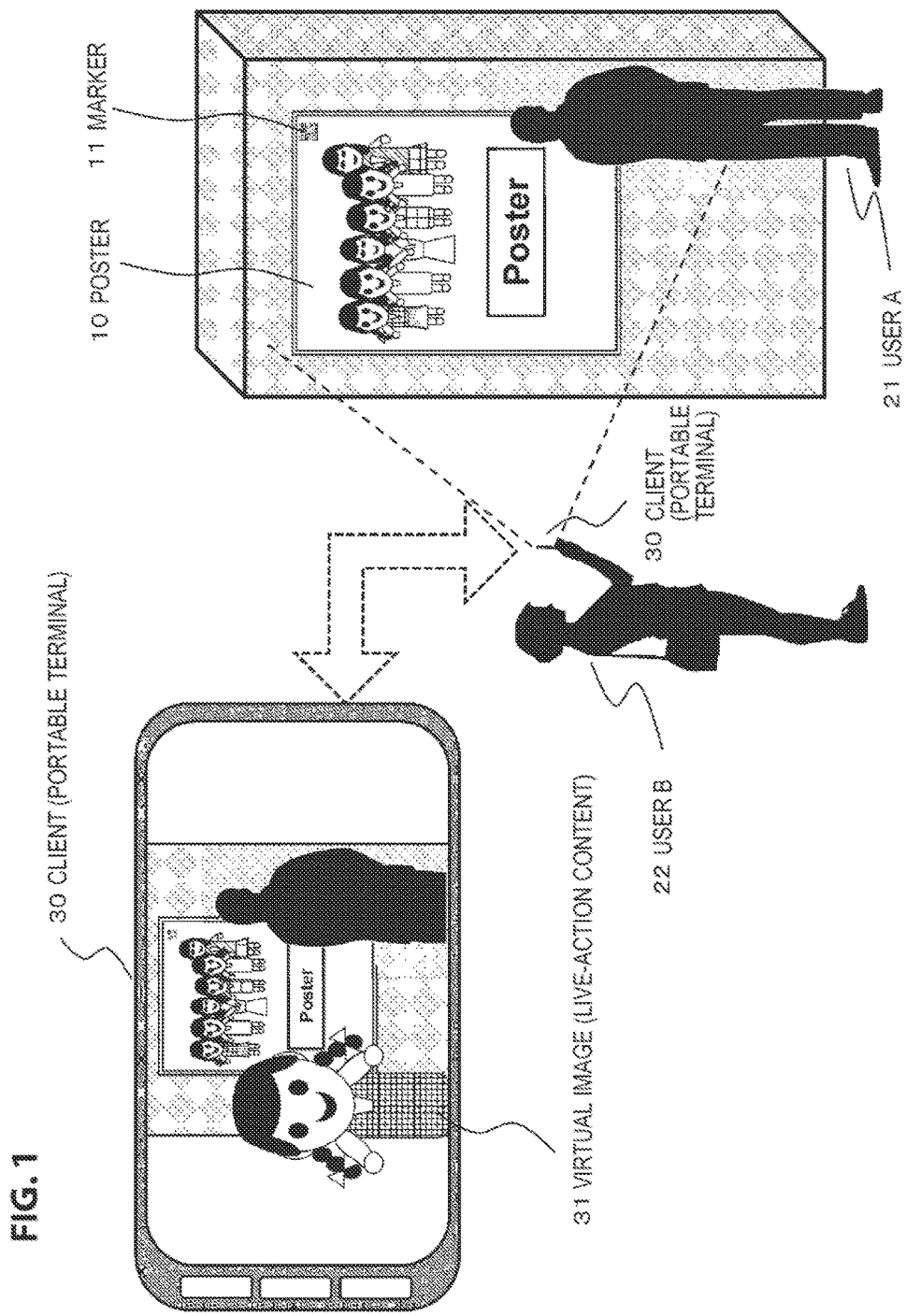
FIG. 1 is a diagram describing an example of use of processing of the present disclosure.

FIG. 1 is a diagram illustrating an example of use of processing of the present disclosure. A user A 21 stands in front of a poster 10, and a user B 22 captures an image, including the poster 10 and the user A 21, by using a portable terminal (client) 30 such as a smartphone with a camera function. Incidentally, the captured image is, for example, a moving image.

The portable terminal (client) 30 transmits capturing information to a server through a communication section of the client (portable terminal) 30. The server recognizes that the client (portable terminal) 30 captures the image including the poster 10, based on the capturing information received from the client (portable terminal) 30, acquires content stored in a content database inside the server, for example, a moving image content generated by capturing a person printed on the poster 10, and transmits the acquired content to the portable terminal (client) 30.

The portable terminal (client) 30 superimposedly displays the content (moving image) received from the server on the image being captured. A virtual image (live-action image) 31 is an image displayed on the client (portable terminal) 30.

As illustrated in FIG. 1, the portable terminal (client) 30 displays an augmented reality (AR) image in which the captured image actually captured by the portable terminal (client) 30 is displayed together with the virtual image received from the server.

The virtual image 31 displayed on the portable terminal (client) 30 is an image of a person who does not exist at a place where the user A and the user B are located.

However, on a screen of the client (portable terminal) 30, the image is displayed as if the person stands next to the user A 21.

The client (portable terminal) 30 can capture and record the captured image, including the virtual image 31, as a moving image or a still image.

However, the user B 22 who performs capture processing by using the portable terminal (client) 30 captures an image while moving the portable terminal (client) 30. At this time, a capturing direction is changed and the image is changed according to a change in the capturing direction.

Figure 2:
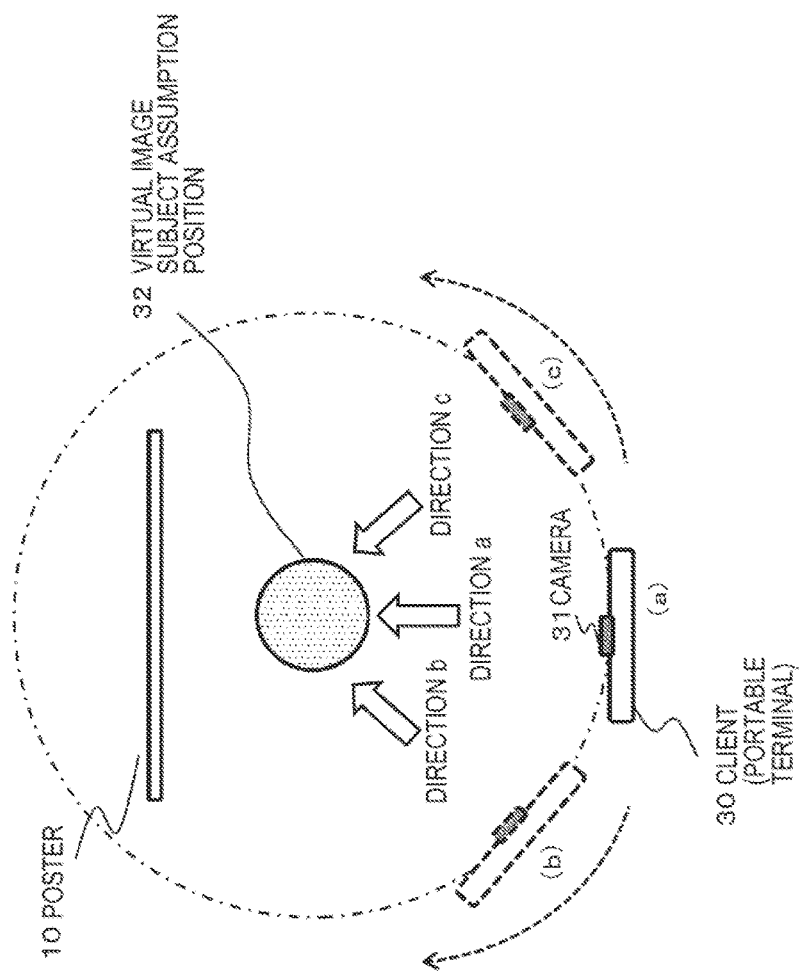
FIG. 2 is a diagram describing an overview of processing of the present disclosure.

For example, as illustrated in FIG. 2, a position of a camera 31 provided in the portable terminal (client) 30 is changed to various positions, such as (a), (b), and (c), by the user.

At this time, the capturing direction of the camera 31 is variously set to, for example, (direction a), (direction b), and (direction c).

In order to display the image as if the subject person of the virtual image 31 displayed on the portable terminal (client) 30 exists at that capturing spot, the virtual image 31 needs to be changed to an image corresponding to each capturing direction, that is, (direction a), (direction b), and (direction c).

For example, as illustrated in FIG. 2, it is assumed that a virtual image subject assumption position 32 is set in front of the poster 10. At this time, as illustrated in FIG. 3, the virtual image 31 displayed on the portable terminal (client) 30 is changed according to the motion of the portable terminal (client) 30 and is set as if the person as the virtual image displayed on the portable terminal (client) 30 exists at that place.

Figure 3:
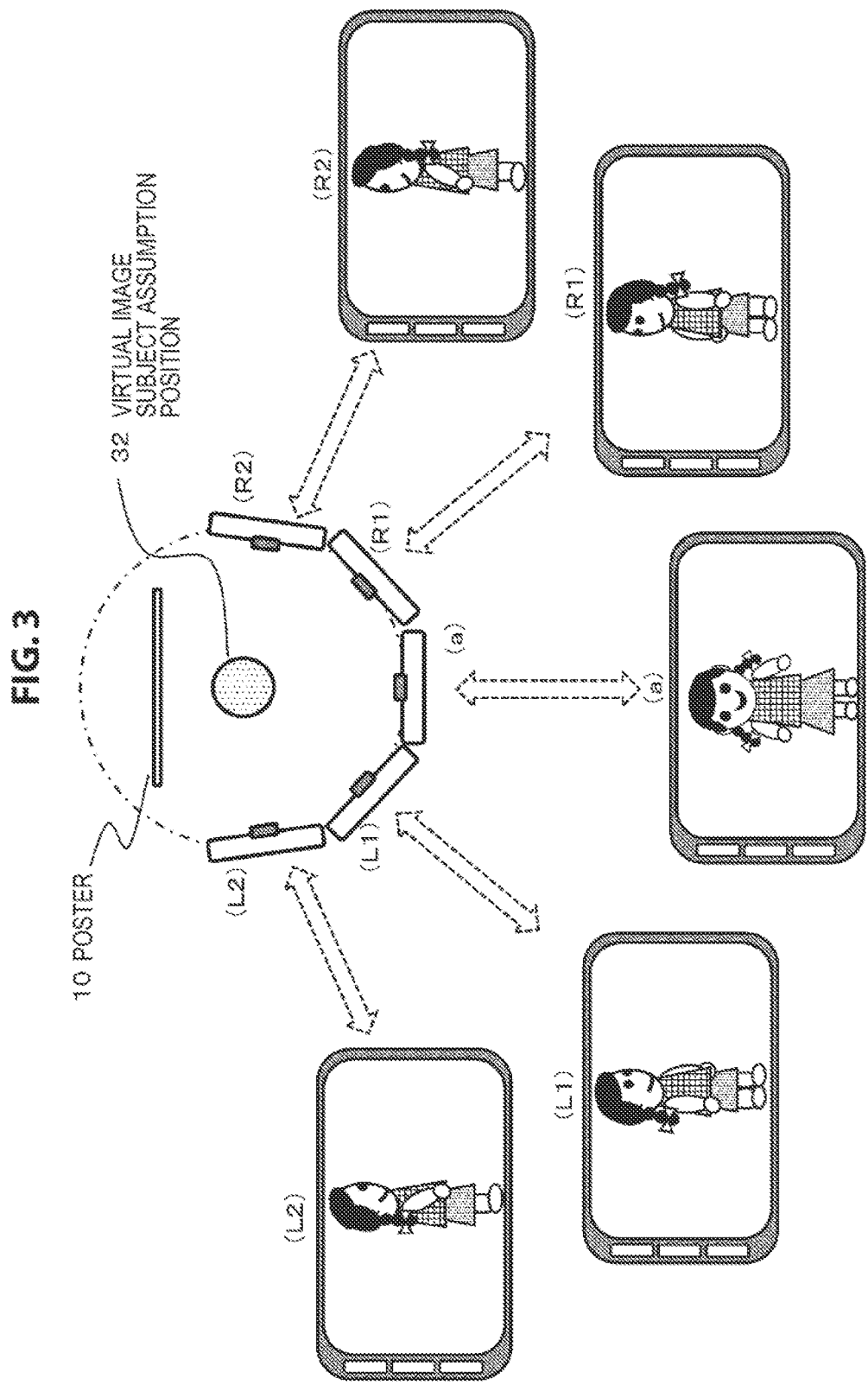
FIG. 3 is a diagram describing an overview of processing of the present disclosure.

FIG. 3 illustrates ideal display image examples of the virtual image corresponding to the following five capturing directions.

FIG. 3(a) is a capturing state from a front side of the virtual image subject assumption position 32.

FIG. 3(R1) is a capturing state from a right oblique direction of the virtual image subject assumption position 32.

FIG. 3(R2) is a capturing state from a right direction of the virtual image subject assumption position 32.

FIG. 3(L1) is a capturing state from a left oblique direction of the virtual image subject assumption position 32.

FIG. 3(L2) is a capturing state from a left direction of the virtual image subject assumption position 32.

As illustrated in FIG. 3, the virtual image corresponding to the motion of the portable terminal is displayed on a display section of the client (portable terminal) 30, and a moving image can be viewed as if the person corresponding to the virtual image exists at that place and can be captured and recorded.

Incidentally, the client that performs the image capture and display is not limited to the smartphone illustrated in FIG. 1 and can be realized by various information processing devices, for example, a PC or a glass-type AR glass.

By applying the processing of the present disclosure, the virtual image can be changed according to the change in the image to be superimposed, when the virtual image such as a person is superimposedly displayed on the image being displayed on the client such as the smartphone or the AR glass, and the virtual image can be displayed as if it exists in a base image to be superimposed.

Specifically, for example, free-viewpoint live-action moving image content observed from various viewpoints is transmitted from the server to the client and is superimposedly displayed on a captured camera image displayed on the display section of the client. In this processing, a virtual image with a natural motion corresponding to the motion of the client (camera) is realized.

Regarding an embodiment that performs the processing of the present disclosure, the following two embodiments will be sequentially described.

(1) Embodiment 1: embodiment in which contents of different viewpoints, which can be displayed in the client, are transmitted from the server (2) Embodiment 2: embodiment in which contents of discrete multiple viewpoints and depth information (depth map) corresponding to the contents are transmitted to the client, and the image of an arbitrary viewpoint to be displayed on the client is generated on the client side.

In embodiment 1, the server delivers moving image content captured from a plurality of different viewpoints to the client. The client selects display content from the received moving image content of each viewpoint according to capturing angle information of the imaging section (camera) of the client, and performs decoding and display processing on the selected moving image content.

In the client, it is only necessary to decode the moving image, and thus, a load is low.

However, since it is necessary to transmit moving images of more viewpoints at a time, a communication load is increased.

In embodiment 2, the server delivers moving image content from discontinuous, that is, discrete different viewpoints. Furthermore, embodiment 2 is an embodiment that also provides depth information (depth map) according to the moving content to be provided to the client. Incidentally, the depth map is configured by data in which distance information from the camera to the subject is set by a pixel unit.

On the client side, the moving image content from discontinuous different viewpoints is used to generate necessary display content, that is, a virtual image observed from a desired direction. For example, an image of a middle viewpoint of the directions A and B is generated and displayed by using the real-action images of the direction A and the direction B and the depth map corresponding to each image.

In this processing, transmission data to be transmitted from the server to the client can be reduced. It is only necessary to transmit the images of at least two viewpoints (three or more viewpoints according to an angle or a position).

However, there may be a need to generate an image of a middle viewpoint on the client side, and the load of the client side is increased.

Incidentally, in ether of embodiments 1 and 2, the client superimposes the virtual image, which is generated or selected according to the position/angle of the camera provided in the client, on the captured camera image that is the base image being displayed in the client. Incidentally, when the virtual image, which is provided by the server and is to be superimposed on the client is, for example, a live-action person image, the permeability of pixel portions other than the person is maximized and the virtual image is moving image content with a channel information of pixel unit, called permeability information or mask information such as setting the permeability of a person region to 0.

By superimposing content with such a channel information on the captured image, only the person region included in the virtual image is superimposed on the captured image of the client and the captured image is directly displayed on the image region other than the person.

Also, although described in detail in the following embodiment, a network delay occurs in communication between the server and the client. Therefore, the content provided from the server to the client needs to be content in which the network delay is considered. That is, for example, the capturing angle of the client after a predetermined time is predicted based on the motion of the client, and the moving image content from a viewpoint within a predetermined range, with the predicted angle as a center, is adaptively delivered.

Due to this processing, a necessary bandwidth can be considerably reduced as compared with the delivery of the moving images of all viewpoints. The processing of the present disclosure can realize, for example, real-time rendering of the virtual image corresponding to the motion of the client, which has been described with reference to FIG. 3.

Incidentally, the motion prediction of the client can be performed as, for example, the processing using the marker included in the captured image of the client. That is, camera position information or camera moving direction, and camera moving speed are acquired from the capturing position of the marker, the motion of the client is predicted from such information, and the camera position and orientation after a predetermined time are estimated. Also, it may be configured to use sensor information of acceleration/gyro sensors provided in the client.

Hereinafter, specific embodiments of the processing according to the present disclosure will be described.

2. First Embodiment of Present Disclosure

A first embodiment of the present disclosure will be described.

As described with reference to FIGS. 1 to 3, the processing of the present disclosure generates and displays the AR image in which the virtual image is superimposed together with the captured image on the display section of the client.

An example in which the virtual image is provided from the server to the client will be described. Incidentally, although described in the latter part, the virtual image can be acquired from the storage section of the client, without being provided from the server.

Figure 4:
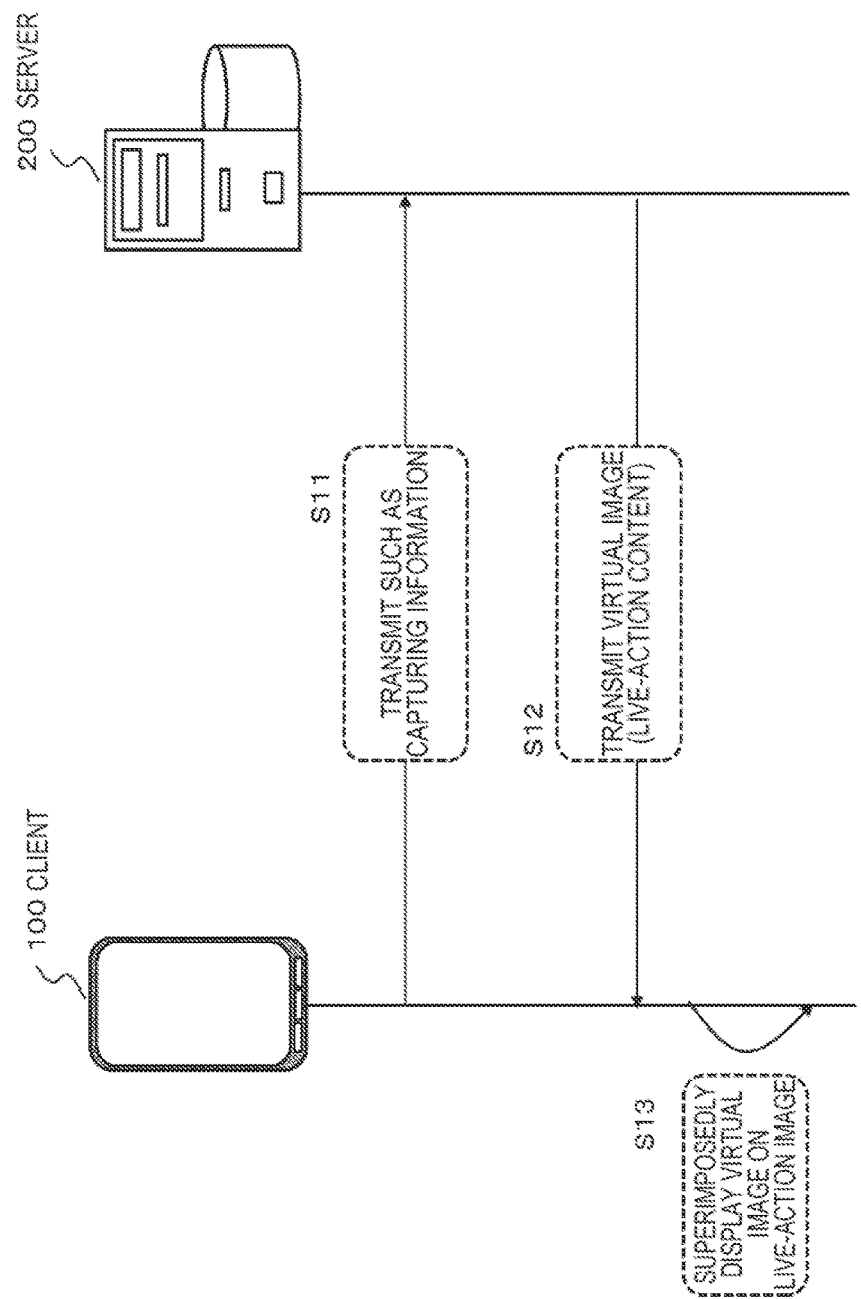
FIG. 4 is a diagram describing an overview of a processing sequence between a server and a client.

A basic communication sequence between the server and the client will be described with reference to FIG. 4.

First, in step S11, a client 100, which performs an image capture, transmits capturing information to a server.

The capturing information may be, for example, information that can confirm that the poster 10 illustrated in FIG. 1 is captured, and may be identification information such as a poster image or a two-dimensional bar code such as a cyber-code set to in the poster 10.

When the capturing information is received from the client, the server 200 acquires moving image content, which is to be provided to the client based on the capturing information, from a database, and transmits the acquired moving image content.

However, in the moving image transmission, the server selects and transmits an image of a viewpoint determined according to the motion of the client 100, that is, a virtual image observed from a direction estimated as a direction in which the client captures an image after a predetermined time. Details of the moving image content transmission will be described below.

Subsequently, in step S13, the client 100 superimposedly displays the moving image content received from the server 200 on the captured image.

The flow of the basic processing of the server and the client is performed as described above.

Furthermore, the detailed processing sequence will be described with reference to a flowchart illustrated in FIG. 5.

Figure 5:
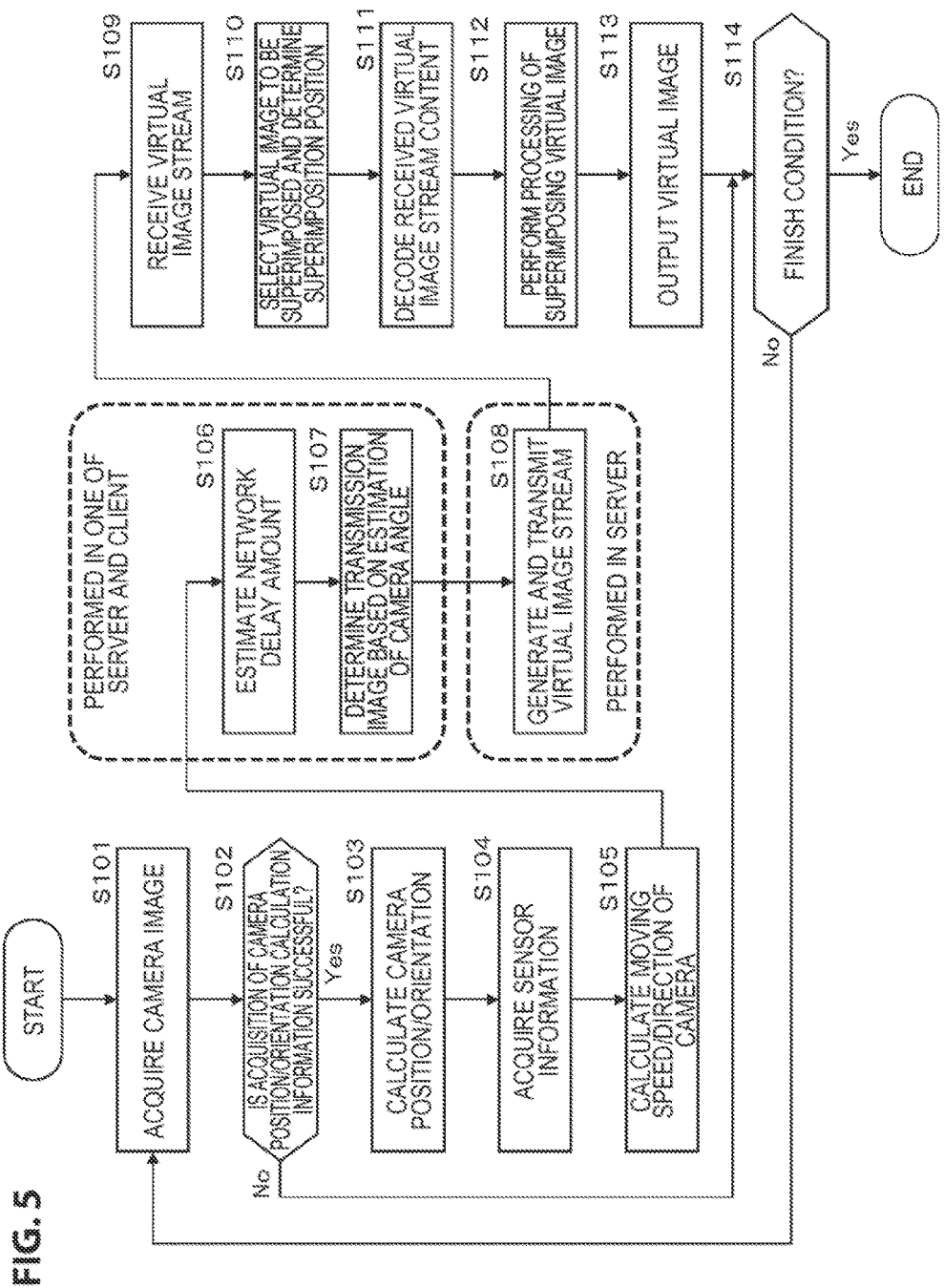
FIG. 5 is a diagram illustrating a flowchart describing a processing sequence of a first embodiment of the present disclosure.

The flow illustrated in FIG. 5 is a flow including the processing of the client that performs the processing of displaying the AR image in which the virtual image is superimposed on the captured image, and the processing of the server that provides the virtual image.

The processing of steps S101 to S105 is processing that is performed by the client, the processing of steps S106 and S107 is processing that is performed by one of the server and the client, the processing of step S108 is processing that is performed by the server, and the processing of steps S109 to S114 is processing that is performed by the client.

Incidentally, the processing illustrated in the flow is performed under the control of a data processing section of the server or the client, that is, a data processing section having a CPU or the like with a program execution function, according to a program stored in, for example, a storage section of the server or the client.

Hereinafter, details of the processing of the respective steps will be sequentially described.

(Step S101)

First, in step S101, the client captures an image. For example, the poster as illustrated in FIG. 1 is captured.

(Step S102)

Subsequently, in step S102, the client determines whether information acquisition for calculating position and angle information of the camera, which is necessary at a latter stage, is successful.

An example of the information for calculating the position and angle information of the camera is a marker included in the captured image. The marker is a two-dimensional bar code such as, for example, a cyber-code printed in advance on the poster 10 illustrated in FIG. 1. When such a marker is recognized, the position or the angle of the camera can be calculated from an angle of a marker reflected on a camera image.

Incidentally, the information for calculating the position and angle information of the camera is not limited to the marker such as the cyber-code, and may be an object itself such as a poster or a CD jacket.

What is used as the information for calculating the position and angle information of the camera is different according to the camera position and angle calculation processing algorithm performed by the client, and the application information can be variously set.

For example, just like the recognition of a three-dimensional position of the camera by extracting and tracking a feature point from an image captured by the camera of the client, position identification processing to which a simultaneous localization and mapping (SLAM) technology is applied may be performed. Incidentally, the processing to which the SLAM is applied is described in, for example, JP 2011-43419A, filed by the same applicant as the applicant of the present application.

Also, in addition, as the information for calculating the position and angle information of the camera, information of a sensor included in the client device may be applied.

As such, in step S102, it is determined whether the acquisition of the camera position and angle information, which is performed by the client, is successful.

When the information is not acquired, it is determined that subsequent AR image generation processing is impossible, and the processing is ended.

When the information is acquired, the processing proceeds to step S103.

(Step S103)

Subsequently, in step S103, the client calculates a current position and orientation of the client (camera) by applying the information acquired in step S102.

(Step S104)

Subsequently, in step S104, the client acquires output values of an acceleration sensor and a gyro sensor provided in the client.

(Step S105)

Subsequently, in step S105, the client calculates a moving speed and a moving direction of the client (camera).

This processing is performed by applying, for example, the current position and orientation of the client (camera), which is calculated in step S103, and the sensor information, which is acquired in step S104.

A specific processing example of step S105 will be described with reference to FIG. 6.

Figure 6:
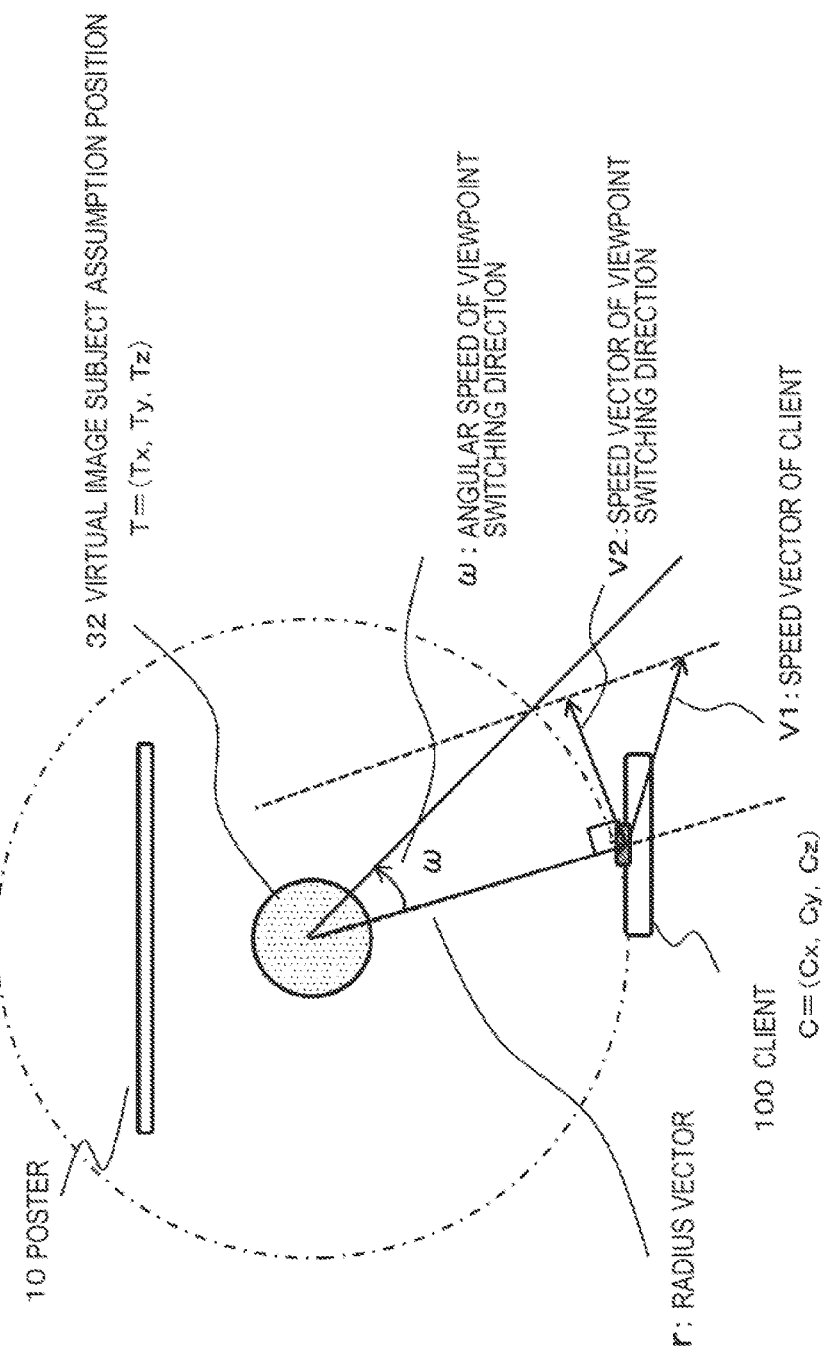
FIG. 6 is a diagram describing estimation processing of a motion mode of a client (camera).

FIG. 6 illustrates the client 100 that displays the captured image and the AR image, and the virtual image subject assumption position 32. The client 100 can be freely moved by the user.

In step S103, a current position $C=(C_x, C_y, C_z)$ of the client is calculated.

In step S104, a speed vector V1 of the client is calculated.

Also, the virtual image subject assumption position T is T=(tx, ty, tz).

A vector (C−T) having the virtual image subject assumption position T=(tx, ty, tz) as a start point and the current position C=(Cx, Cy, Cz) of the client as an end point is set as a radius vector r.

The purpose of the processing of step S105 is to calculate an angular speed ω illustrated in FIG. 6, that is, an angular speed ω of a viewpoint switching direction with respect to the virtual image subject.

The angular speed ω illustrated in FIG. 6 is an angular speed corresponding to the motion of the client 100 at the current time.

First, a speed vector v2 of the client 100 in a direction perpendicular to the radius vector r is calculated based on the speed vector v1.

The speed vector v2 is a speed vector in the viewpoint switching direction corresponding to the virtual image subject.

The angular speed ω in the viewpoint switching direction corresponding to the virtual image subject can be calculated by the following formula, based on the radius vector r and the speed vector v2 of the client in the direction perpendicular to the radius vector r.

$$\omega = |r \times v2| / r^2$$

The angular speed ω in the viewpoint switching direction corresponding to the virtual image subject is calculated based on the above formula.

(Step S106)

The processing of steps S106 and S107 is processing that is performed by one of the client and the server.

In step S106, for example, a ping command is transmitted and received between the client and the server, and a round trip time (RTT) is calculated.

(Step S107)

Subsequently, the capturing angle of the client (camera) after the predetermined time is estimated based on the moving direction and speed of the client (camera) obtained in step S105 and the network delay time obtained in step S106, an angle range of the virtual image content to be transmitted to the client is set, and the transmission image is determined.

Details of the processing of step S107 will be described with reference to FIG. 7 and thereafter.

The processing of step S107 is performed by processing of steps S201 to S203 of a flow illustrated in FIG. 7.

(Step S201)

First, the center viewpoint of the client (camera) after a network delay time Δt is calculated.

The current time is T, the network delay time is Δt, the camera viewpoint of the client at the current time T is $\theta_T$, and the angular speed in the viewpoint switching direction of the client at the current time T is $\omega_T$.

Incidentally, the network delay time Δt is a round trip time (latency) from the client to the server.

Incidentally, as the operation of the client by the user, there are operations such as zoom in/zoom out, as well as the motion of the camera, but these can be supported by the processing of changing a size of the subject. Herein, in order to acquire information for selecting the moving image corresponding to the client viewpoint from the moving image content of each viewpoint corresponding to the virtual image, the processing using the angular speed $\omega_T$ in the viewpoint switching direction is performed.

At the current time T, data required to be transmitted to the client by the server is a virtual image that is observed from an estimated position of the client after the network delay time Δt from the current time T, that is, at the time T+Δt.

That is, the server transmits a plurality of virtual image contents that is captured from a viewpoint that is not in a predetermined angle range, with the client viewpoint $\theta_{T+\Delta t}$ at the time T+Δt as a center. The client selects the image corresponding to the actual position of the client from the plurality of images and displays the selected image.

In this way, in the processing of the present disclosure, the motion of the client is predicted, and the image of the viewpoint corresponding to the predicted position of the client is selected and provided from the server to the client.

This processing reduces an amount of transmission data, reduces the processing load of the client side, and realizes the display of the AR image efficiently and with highly accurately.

The client viewpoint $\theta_{T+\Delta t}$ at the time T+Δt can be simply calculated based on the following formula.

$$\theta_{T+\Delta t} = \theta_T + \omega_T \Delta t$$

In step S201, the client viewpoint $\theta_{T+\Delta t}$ at the time T+Δt is calculated based on the above formula. That is, the center viewpoint of the client (camera) after the network delay time Δt is calculated.

Incidentally, the client viewpoint $\theta_{T+\Delta t}$ at the time T+Δt may be calculated considering an angular acceleration of the client and an angular speed at the time T+Δt.

(Step S202)

Subsequently, a viewpoint range of the image to be transmitted from the server to the client is determined.

The client viewpoint $\theta_{T+\Delta t}$ obtained in step S201 is one viewpoint corresponding to the position of the client after Δt from the current time T, which is estimated under the assumption of the data acquired at the time T.

However, in practice, the user does not necessarily move the client according to the assumption of the data acquired at the time T, and the moving speed or direction of the client (camera) can be sequentially changed. Also, the network delay time is inconstantly changed by a communication state of the network.

Therefore, the client viewpoint $\theta_{T+\Delta t}$ obtained in step S201 is not unnecessarily matched to the actual client viewpoint at the time T+Δt and is merely one viewpoint position predicted to occur with high probability.

In a case where the server transmits only one virtual image content corresponding to the client viewpoint $\theta_{T+\Delta t}$ to the client, when the actual client viewpoint is matched with the viewpoint $\theta_{T+\Delta t}$, it is only necessary to display the transmission image, but an erroneous image is displayed if the actual client viewpoint is deviated.

In order to prevent the display of such an erroneous image, the server transmits an image of a viewpoint around that viewpoint to the client, as well as the virtual image corresponding to the client viewpoint $\theta_{T+\Delta t}$ estimated in step S201.

In step S202, a viewpoint range corresponding to a plurality of image contents of different viewpoints to be transmitted to the client is determined.

For the determination of the viewpoint range, various methods can be used.

For example, the following processing can be performed: the angular speed $\omega_{T+\Delta t}$ of the client at the time T+Δt is predicted at the timepoint of the current time T, a log of a difference ratio of the predicted angular speed to the actual angular speed $\omega_{T+\Delta t}$ of the client at the time T+Δt is collected, and ±2σ of the standard deviation of the error ratio is set to an angle range to be transmitted.

Also, instead of using such a log, an angle range±n degrees may be set in advance, and an image of a range of client viewpoint $\theta_{T+\Delta t}$±n degrees estimated in step S201 may be set as the transmission image.

Furthermore, the image of the range of client viewpoint $\theta_{T+\Delta t}$±n degrees may be set as the transmission image, a function $f(\omega_T, \Delta t)$ having values of the client angular speed $\omega_T$ of the time T and the network delay time Δt as parameters may be set, and the angle range of the transmission image can be determined by the setting of gradually increasing the angle range if the function $f(\omega_T, \Delta t)$ exceeds a preset threshold value.

In this way, in step S202, for example, the moving image content of the following multiple viewpoints are determined as the content to be transmitted to the client.

(1) Moving image content 1 in which the subject (for example, the person) corresponding to the virtual image is captured from the client viewpoint $\theta_{T+\Delta t}$ calculated in step S201

(2) Moving image content 2 in which the subject (for example, the person) corresponding to the virtual image is captured from the viewpoint of client viewpoint $\theta_{T+\Delta t}$+k degrees (3) Moving image content 3 in which the subject (for example, the person) corresponding to the virtual image is captured from the viewpoint of client viewpoint $\theta_{T+\Delta t}$−k degrees (4) Moving image content 4 in which the subject (for example, the person) corresponding to the virtual image is captured from the viewpoint of client viewpoint $\theta_{T+\Delta t}$+2k degrees (5) Moving image content 5 in which the subject (for example, the person) corresponding to the virtual image is captured from the viewpoint of client viewpoint $\theta_{T+\Delta t}$−2k degrees For example, the five moving image contents are determined as the contents to be transmitted to the client.

(Step S203)

In step S202, the moving images of the multiple viewpoints within the predetermined range including the client viewpoint $\theta_{T+\Delta t}$ estimated in step S201 are determined as the images to be transmitted to the client.

For example, the determined moving images are the above moving image contents (1) to (5).

However, the viewpoint positions of the plurality of moving image contents are viewpoint positions determined based on the motion prediction of the client (camera), and it is estimated that the probability that the client (camera) will be set to the viewpoints corresponding to the above images (1) to (5) is different.

That is, the client viewpoint $\theta_{T+\Delta t}$ estimated in step S201 is a viewpoint at which it is estimated that it will occur with the highest probability as the viewpoint of the client at the time T+Δt, and it is estimated that the occurrence probability will be reduced as the distance from that viewpoint is increased.

When the entire image contents of the multiple viewpoints included in the viewpoint range set in step S202 are transmitted as high-resolution images, the amount of data is increased and it is highly likely that the delay of the communication time will occur and the processing efficiency will be lowered.

In order to prevent the occurrence of such problems, the image contents of the multiple viewpoints included in the viewpoint range set in step S202 are transmitted as the following setting.

That is, the image of the viewpoint estimated to be high probability as the viewpoint of the client at the time T+Δt is transmitted as a high-resolution image, and the image in the range estimated to be low probability is transmitted as a low-resolution image.

When the image transmission is performed in such a setting, the amount of the transmission data is reduced.

In step S203, in order to enable the image transmission in such a setting, the probability that the client (camera) will be set to each viewpoint position included in the viewpoint range set in step S202 is estimated.

Specifically, for example, a normal distribution is set such that the client viewpoint $\theta_{T+\Delta t}$ at the time T+Δt calculated in step S201 has the maximum probability, and the probability that the client (camera) will be set to each viewpoint position is estimated by applying a probability density function according to the normal distribution.

Specifically, the probability calculation algorithm for each viewpoint will be described with reference to FIG. 8 and thereafter.

FIG. 8 illustrates the normal distribution in which the client viewpoint $\theta_{T+\Delta t}$ at the time T+Δt calculated in step S201 has the maximum probability.

A horizontal axis represents the viewpoint and a vertical axis represents the occurrence probability.

The center (0) of the viewpoint axis corresponds to the client viewpoint $\theta_{T+\Delta t}$ at the time T+Δt calculated in step S201.

Normal distribution data illustrated in FIG. 8 is a viewpoint probability density function made up of normal distribution data with average=0 and standard deviation σ, with the client viewpoint $\theta_{T+\Delta t}$ at the time T+Δt calculated in step S201 as a reference, based on the following parameters.

The client angular speed of the time T is $\omega_T$,
the network delay time is Δt,
standard deviation is $\sigma = \alpha |\omega_T| + \Delta t$,
where α is a preset coefficient and β is a preset positive integer.

As an example, FIG. 8 illustrates an example in which the network delay time Δt=100 ms and the angular speed ω of the client (camera) are set to the following three cases.

$\omega = 0$ deg/s, $\omega = 2$ deg/s, $\omega = 10$ deg/s,

As the angular speed ω of the client (camera) is lower, the occurrence probability of the client viewpoint $\theta_{T+\Delta t}$ at the time T+Δt calculated in step S201 is higher as compared with the occurrence probability of the surrounding viewpoints.

On the other hand, as the angular speed ω of the client (camera) is higher, a difference between the occurrence probability of the client viewpoint $\theta_{T+\Delta t}$ at the time T+Δt calculated in step S201 and the occurrence probability of the surrounding viewpoints is reduced.

By using the normal distribution data illustrated in FIG. 8, that is, the normal distribution data in which the client viewpoint $\theta_{T+\Delta t}$ at the time T+Δt calculated in step S201 has the maximum probability, the probability that the client (camera) will be set to each viewpoint position included in the viewpoint range set in step S202 is estimated.

Incidentally, in the normal distribution data illustrated in FIG. 8, the center (0) of the viewpoint axis is set to the client viewpoint $\theta_{T+\Delta t}$ at the time T+Δt calculated in step S201.

The probability density function indicating the occurrence probability corresponding to each angle when the center (0) of the viewpoint axis is set to the actual client viewpoint $\theta_T$ at the time T is set as illustrated in FIG. 9.

As an example, FIG. 9 illustrates an example in which the network delay time Δt=100 ms and the angular speed ω of the client (camera) are set to the following five cases.

ω=0 deg/s,

ω=−2 deg/s,

ω=+2 deg/s,

ω=−10 deg/s,

ω=+10 deg/s,

The probability density function illustrated in FIG. 9 indicates the probability of the client position estimated when the center (0) of the viewpoint axis is set to the actual client viewpoint $\theta_T$ at the time T and is located at the position after the time Δt with respect to the angular speed ω of the client (camera).

This is the setting in which it is highly likely that it will be deviated to a left direction when the angular speed ω is (−) and will be deviated to a right direction when the angular speed ω is (+)

Also, the probability density function illustrated in FIG. 8 is an example in which the network delay time is Δt=100 ms, but the probability density function is changed according to the value of the network delay time Δt.

FIG. 10 illustrates the probability density function when the angular speed ω of the client (camera) is −3 deg/s and the network delay time Δt is set to the following three cases.

Δt=10 ms,

Δt=100 ms,

Δt=1000 ms,

As the network delay time Δt is smaller, the occurrence probability of the client viewpoint $\theta_{T+\Delta t}$ at the time T+Δt calculated in step S201 is higher as compared with the occurrence probability of the surrounding viewpoints.

On the other hand, as the network delay time Δt is higher, a difference between the occurrence probability of the client viewpoint $\theta_{T+\Delta t}$ at the time T+Δt calculated in step S201 and the occurrence probability of the surrounding viewpoints is reduced.

Incidentally, the network delay time Δt has only to generate the normal distribution data illustrated in FIG. 8 by applying the value acquired at the time T.

Incidentally, since the network delay time Δt is measured by the one-time transmission and reception of the ping data, the accurate delay time is not always measured. Considering this, a fluctuation compensation of the delay time may be performed.

FIG. 11 illustrates the fluctuation compensation graph of the delay time.

A horizontal axis represents a viewpoint axis in which the client viewpoint $\theta_{T+\Delta t}$ at the time T+Δt calculated in step S201 is set as the center (0), and a vertical axis represents the occurrence probability.

Incidentally, it is assumed that the angular speed ω of the client (camera) at the time T is continued without change.

The delay time standard deviation is set as $\sigma_t$ and the fluctuation compensation angle range is set as $\alpha\omega\sigma_t$.

α is a preset coefficient.

On this assumption, an irregular normal distribution function taking a constant maximum value at the interval of the angle range 0 to $\alpha\omega\sigma_t$ (or $\alpha\omega\sigma_{tn}$ to 0) is defined as a probability density function.

That is, when $\alpha\omega\sigma_t>0$,

θ>αωσ_t

−p=NORMDIST(θ,αωσ_t,σ)

0=<θ=<αωσ_t

−p=NORMDIST(0,0,σ)

θ<0

−p=NORMDIST(θ,0,σ)

Incidentally, NORMDIST (x, u, σ) is a probability density function of x at a century distribution of average u and standard deviation σ.

The graph of FIG. 11 indicates the probability density function.

FIG. 11 illustrates an example when the delay time standard deviation σ is set to three cases: σ=1 ms, 10 ms, 100 ms.

For example, the fluctuation compensation may be performed by applying the fluctuation compensation graph of the delay time illustrated in FIG. 11 to the network delay time Δt acquired based on the transmission and reception of the ping command at the time T, and the normal distribution data illustrated in FIG. 8 may be generated by reflecting the result.

In step S203 of the flow illustrated in FIG. 7, by performing the above processing, the probability density function made up of the normal distribution data illustrated in FIG. 8 is set by applying the respective data measured at the time T, or correction data, for example, and the probability that the client (camera) will be set to each viewpoint position included in the viewpoint range set in step S202 is estimated according to the probability density function.

In this way, in step S107 of the flow illustrated in FIG. 5, the processing of selecting the transmission image is performed based on the estimation of the camera angle according to the flow illustrated in FIG. 7, and the probability that the client will be set to each viewpoint of the each selected image is calculated.

Specifically, for example, the transmission image data is determined as illustrated in FIG. 12, and the probability of each determined transmission image, that is, the probability that the client will be set to the position of the image of that viewpoint is calculated.

The data illustrated in FIG. 12 is an example of data set in step S107.

In step S107, for example, as illustrated in FIG. 12, the following data (1) to (5) are determined as the transmission images, and the probability of each image is calculated.

(1) Moving Image Content 1 (View 1)

Moving image content 1 in which the subject (for example, the person) corresponding to the virtual image is captured from the client viewpoint $\theta_{T+\Delta t}$ calculated in step S201, Probability that the client will be set to the position corresponding to the image viewpoint of the moving image content 1=0.40.

(2) Moving Image Content 2 (View 2)

Moving image content 2 in which the subject (for example, the person) corresponding to the virtual image is captured from the client viewpoint $\theta_{T+\Delta t}+k$ degrees Probability that the client will be set to the position corresponding to the image viewpoint of the moving image content 2=0.20.

(3) Moving Image Content 3 (View 3)

Moving image content 3 in which the subject (for example, the person) corresponding to the virtual image is captured from the client viewpoint $\theta_{T+\Delta t}-k$ degrees Probability that the client will be set to the position corresponding to the image viewpoint of the moving image content 3=0.20.

(4) Moving Image Content 4 (View 4)

Moving image content 4 in which the subject (for example, the person) corresponding to the virtual image is captured from the client viewpoint $\theta_{T+\Delta t}+2k$ degrees Probability that the client will be set to the position corresponding to the image viewpoint of the moving image content 4=0.05.

(5) Moving Image Content 5 (View 5)

Moving image content 5 in which the subject (for example, the person) corresponding to the virtual image is captured from the client viewpoint $\theta_{T+\Delta t}-2k$ degrees Probability that the client will be set to the position corresponding to the image viewpoint of the moving image content 5=0.05.

In step S107, for example, the probability of determining and generating such transmission images is determined.

(Step S108)

Next, the processing of step S108 of the flowchart illustrated in FIG. 5 will be described.

The processing of step S108 is processing that is performed by the server.

The server generates a stream to be transmitted to the client by using the data determined in the processing of step S107, that is, for example, the probability data and the images to be transmitted to the client as illustrated in FIG. 12.

Figure 13:
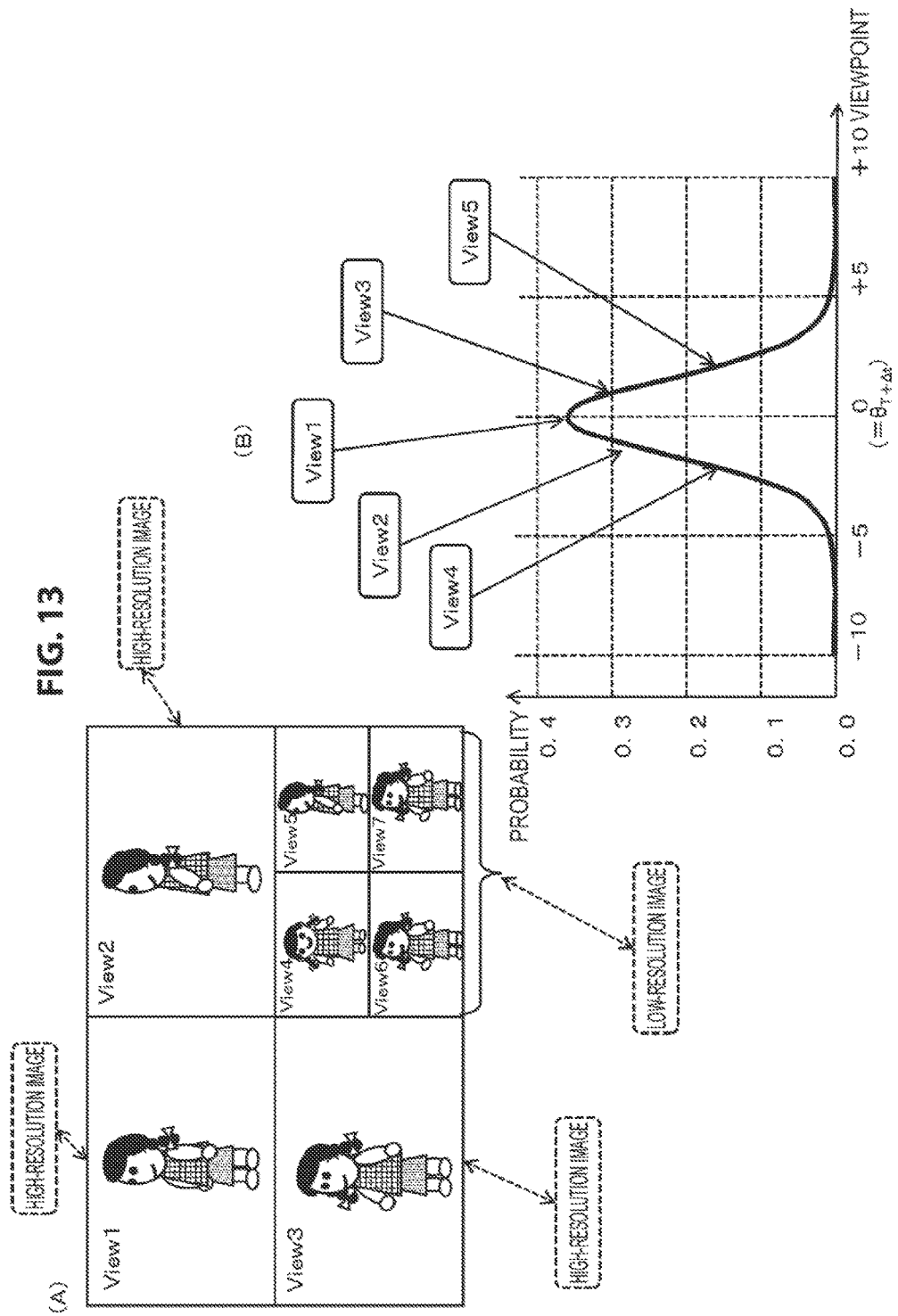
FIG. 13 is a diagram describing an example of transmission data to a client.

A stream generation example is illustrated in FIG. 13.

For example, the server generates a stream including a plurality of moving image contents illustrated in FIG. 13(A) and transmits the stream to the client.

FIG. 13(B) is a graph of the probability density function described above with reference to FIG. 8 and illustrates the probability of the client (camera) set to each angle, with the estimated angle at the time T+Δt of the client (camera) as the center (0) of a horizontal axis.

This probability corresponds to the probability of the data illustrated in FIG. 12.

As illustrated in FIG. 13(A), the server generates stream data of multiple images in which the image of the viewpoint with high probability is configured as the high-resolution image (high-bit-rate image) and the image of the viewpoint with low probability is configured as the low-resolution image (low-bit-rate image), as the image 1 (View 1), the image 2 (View 2), the image 3 (View 3), . . . , the image 7 (View 7) in descending order of probability, and transmits the stream data to the client.

The example illustrated in FIG. 13(A) is a setting example of the transmission image stream when the probability distribution illustrated in FIG. 13(B) is acquired.

Figure 14:
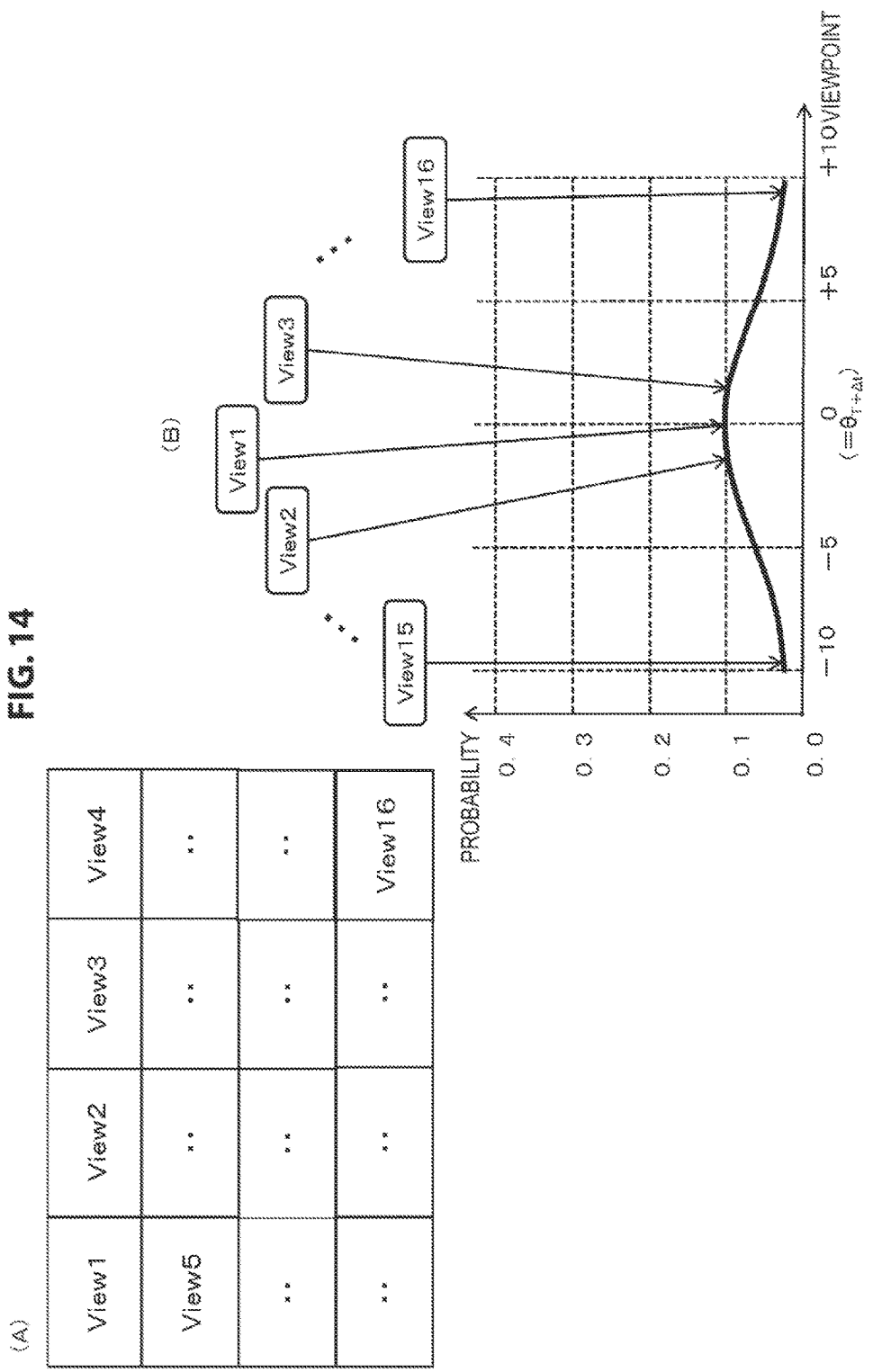
FIG. 14 is a diagram describing an example of transmission data to a client.

In this regard, for example, as illustrated in FIG. 14(B), when the probability distribution is smooth, the image stream data in which images of different viewpoints are all set as the data of the same resolution may be generated and transmitted as illustrated in FIG. 14(A).

Incidentally, the image of each viewpoint may be transmitted as a separate stream, but it may be set such that multiple images of multiple viewpoints are packed into one stream and then transmitted.

Also, in order to suppress the load of the server, it is desirable that the image stream of each viewpoint is generated in advance for each resolution and bit rate and is stored in a database, instead of real-time encoding.

Incidentally, the image data to be transmitted from the server to the client is data that is encoded by, for example, a predetermined encoding algorithm such as MPEG, and it is necessary to perform decoding processing on the client side. In the client, when the display is switched to the image stream of different viewpoints, it is necessary to select different moving image streams and newly start decoding. Due to the delay at the time of switching the stream, it is apprehended that smooth image switching will become impossible.

In order to minimize the delay of the decoding processing, the image stream to be provided to the client is set to two types of image streams: (a) moving image sequence in which all frames are key frames, and (b) general moving image sequence.

The moving image sequence in which all frames are key frames is, for example, encoded data that are configured by image frames capable of decoding each image frame by itself. The general moving image sequence is, for example, encoded data that need to be decoded with reference to the previous or next image frame.

The client can first read the first frame from the "moving image sequence in which all frames are key frames" at the time of switching the stream, perform fast decoding processing to display the first frame on the display section and continue the display by reading the second and subsequent frames from the "general moving image sequence" and decoding the second and subsequent frames. Thus, the delay at the time of display switching can be reduced.

Also, in order to reduce the load of the content decoding on the client side, it may be configured such that the stream to deliver the image of the maximum probability is set as a fixed stream, and partial real-time encoding is performed to deliver contents of different viewpoints changed according to the motion of the client by using the same fixed stream.

In this way, by transmitting the image of the viewpoint with high probability as a higher bit rate and resolution data, high-quality images can be displayed with high probability. Also, since the image of the viewpoint with low probability is also transmitted, it is possible to reduce the probability that the image of the corresponding viewpoint will not be displayed, even when the client is suddenly moved.

(Step S109)

Returning to the flow of FIG. 5, the description about the processing sequence of embodiment 1 will be continued.

When the image transmission is performed by the server in step S108, the client receives the image stream of the virtual image in step S109.

For example, the image stream is a stream made up of moving image data of the images of multiple viewpoints described with reference to FIG. 13(A) or 14(A).

(Step S110)

Subsequently, the client calculates the camera position and angle upon reception of the stream, selects the virtual image to be displayed on the display section of the client, and determines the superimposition position of the selected virtual image. The processing of calculating the camera position and angle is the same processing of steps S102 and S103 as described above and determines the processing of selecting the virtual image and the superimposition position by applying the calculation result.

(Step S111)

Subsequently, in step S111, the client performs the decoding processing on the virtual image stream selected as the image to be displayed.

(Step S112)

Subsequently, in step S112, the client superimposes the decoded content on the captured camera image being displayed on the display section of the client.

(Step S113)

Subsequently, in step S113, the client outputs an AR image in which the virtual image is superimposed on the captured image as the final result on the display section (display) of the client.

(Step S114)

In step S114, it is determined whether a predetermined finish condition, such as the finish of the image capture processing or the finish of the application, occurs, and non-processing is ended when the finish condition occurs. When the finish condition does not occur, the processing returns to step S101 and the same processing is repeated.

In this way, the virtual image transmitted from the server is superimposedly displayed on the captured image that is displayed on the display section of the client.

Incidentally, in the flowchart illustrated in FIG. 5, it may be configured such that the processing of steps S105 to S107 is omitted, and, after the acquisition of the camera position/orientation information in step S103 and the calculation of the moving direction and speed of the camera in step S104, the virtual image to be displayed on the display section is generated or selected and then output to the display section, based on such acquired information, that is, space position information such as the position, orientation, or motion of the camera.

Figure 15:
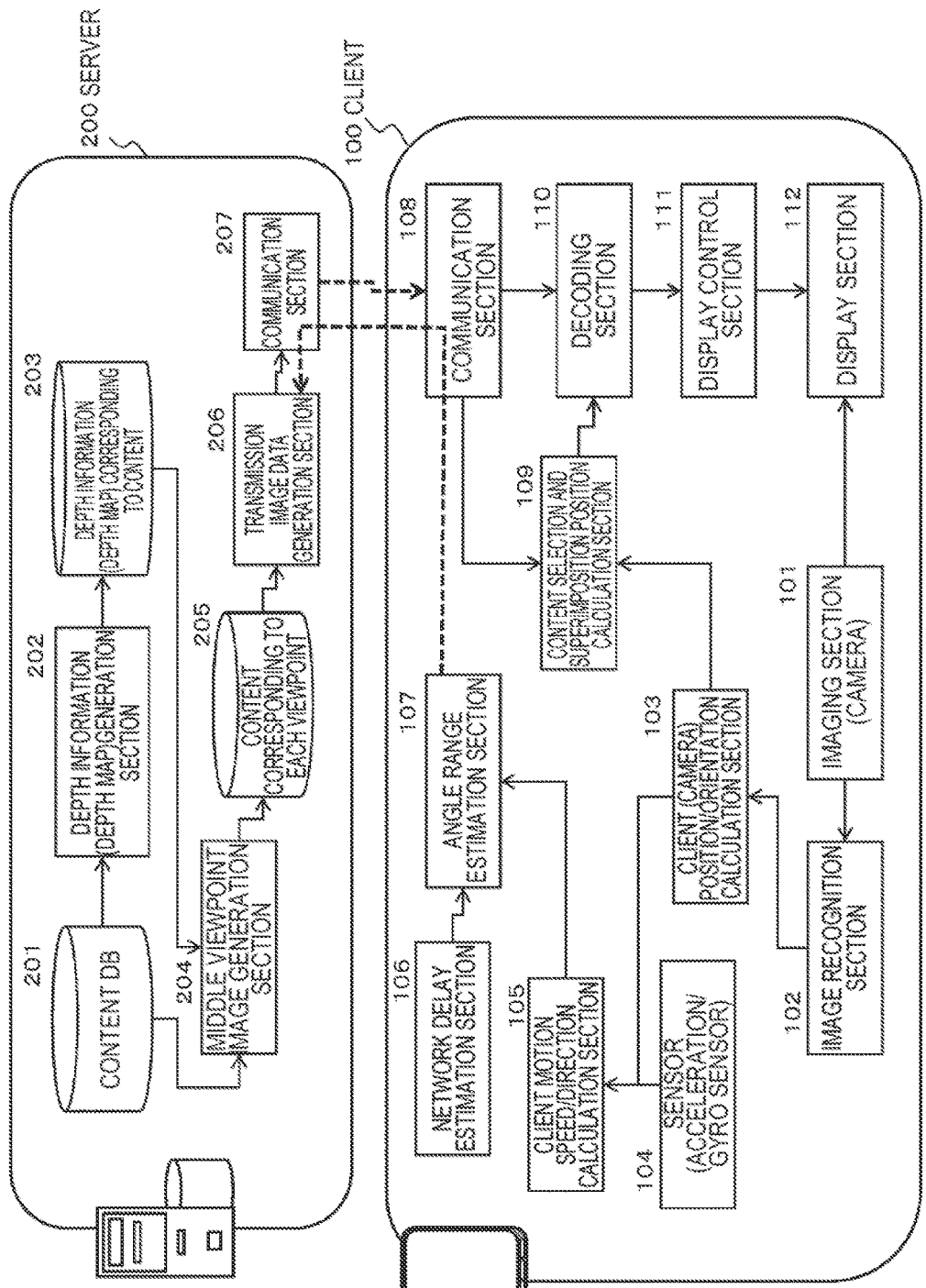
FIG. 15 is a diagram describing a configuration example of a server and a client in a first embodiment of the present disclosure.

FIG. 15 illustrates a configuration example of the server 200 and the client 100 that perform the present embodiment 1.

Data transmission and reception is performed between a communication section 108 of the client 100 and a communication section 207 of the server 200.

Incidentally, in FIG. 15, a network delay estimation section 106 and an angle range estimation section 107, which are illustrated in the configuration of the client 100, may be set as elements of the server 200, instead of the client 100.

The client 100 and the server 200, which are illustrated in FIG. 15, perform the above-described processing according to the flow illustrated above in FIG. 5.

The processing, which is performed by the respective sections illustrated in FIG. 15, will be described in association with the processing of the respective steps of the flow of FIG. 5.

An imaging section (camera) 101 of the client 100 performs the camera image acquisition processing of step S101 of the flow illustrated in FIG. 5.

An image recognition section 102 performs the camera position/orientation calculation information acquisition processing of step S102 of the flow of FIG. 5. Specifically, for example, the processing of recognizing the marker set to the subject such as the poster illustrated in FIG. 1 is performed.

A client (camera) position/orientation calculation section 103 performs the camera position/orientation calculation processing of step S103 of the flow of FIG. 5.

A sensor (acceleration/gyro sensor, etc.) 104 performs the sensor information acquisition processing of step S104 of the flow of FIG. 5.

A client moving speed/direction calculation section 105 performs the client (camera) moving speed/direction calculation processing of step S105 of the flow of FIG. 5.

A network delay estimation section 106 performs the network delay estimation processing of step S106 of the flow of FIG. 5.

An angle range estimation section 107 performs the processing of step S107 of the flow of FIG. 5, that is, the transmission image determination processing and the probability estimation processing, based on the client (camera) position estimation.

Incidentally, the network delay estimation section 106 and the angle range estimation section 107 may be set to the server 200 side and performed as the processing of the server 200.

The angle range estimation section 107 determines the transmission image based on the client (camera) position estimation and calculates the probability corresponding to each transmission image, that is, the probability that the client will be set to the viewpoint position corresponding to each image. Specifically, for example, the data described above with reference to FIG. 12 is generated.

The data is input to a transmission image data generation section 206 of the server 200 through a communication section.

The server 200 previously generates the image content (moving image stream) of multiple viewpoints to be provided to the client, and holds the image content as the content 205 corresponding to each viewpoint.

The server generates the content 205 corresponding to each viewpoint by performing the following processing as pre-processing.

That is, a depth information (depth map) generation section 202 acquires content stored in a content database 201, that is, image content of discrete multiple viewpoints, and generates depth information (depth map) 203 corresponding to the image.

Furthermore, a middle viewpoint image generation section 204 generates image content of a middle viewpoint, which is not included in the content stored in the content database 201, by applying the content stored in the content database 201 and the depth information (depth map) 203, For example, the server 200 previously generates the image of each viewpoint of 360 degrees with respect to a certain subject, which includes the content stored in the content database 201 and the image content of the middle viewpoint that is not included in the content stored in the content database 201, as the content 205 corresponding to each viewpoint.

The transmission image data generation section 206 of the server 200 performs the processing of generating the transmission stream from the content 205 corresponding to each viewpoint to the client, based on the image content to be transmitted to the client. That is, the process of step S108 of the flow illustrated in FIG. 5 is performed.

For example, the server generates the stream to be transmitted to the client by using the probability data and the images to be transmitted to the client as illustrated in FIG. 12.

Specifically, for example, the stream is combined data of the image contents of the multiple viewpoints as illustrated in FIGS. 13(A) and 14(A).

The transmission data generated by the transmission image data generation section 206 is transmitted to the communication section 108 of the client 100 through the communication section 207.

The communication section 108 of the client 100 performs the virtual image stream reception processing of step S109 of the flow of FIG. 5.

A content selection and superimposition position calculation section 109 of the client 100 performs the processing of step S110 of the flow of FIG. 5, that is, the processing of selecting the virtual image and determining the superimposition position. That is, the camera position and angle are calculated upon reception of the stream, the virtual image to be displayed on the display section of the client is selected, and the superimposition position of the selected virtual image is determined.

A decoding section 110 performs the processing of step S111 of the flow of FIG. 5, that is, the processing of decoding the selected virtual image stream.

A display control section 111 performs the processing of steps S112 and S113 of the flow of FIG. 5, that is, outputs an AR image in which the decoded content is superimposed on the captured camera image that is displayed on the display section 112 of the client 100.

In this way, the virtual image transmitted from the server is superimposedly displayed on the captured image that is displayed on the display section of the client.

Incidentally, the configuration illustrated in FIG. 15 is a diagram illustrating the main configuration of the server and the client. Besides the configuration illustrated in the drawing, the server and the client include, for example, the control section having the CPU or the like that controls the processing described with reference to FIG. 6, or the storage section that stores the program to be performed by the control section.

3. Second Embodiment of Present Disclosure

Next, a second embodiment of the present disclosure will be described.

The second embodiment is an embodiment in which contents of discrete multiple viewpoints and depth information (depth map) corresponding to the contents are transmitted from the server to the client, and the image of an arbitrary viewpoint to be displayed on the client is generated on the client side.

That is, the server transmits the depth map and the image for the virtual image generation for the purpose of generating the virtual image to be displayed to the client.

The above-described processing of the first embodiment and the case of the second embodiment will be described with reference to FIGS. 16 and 17.

Figure 16:
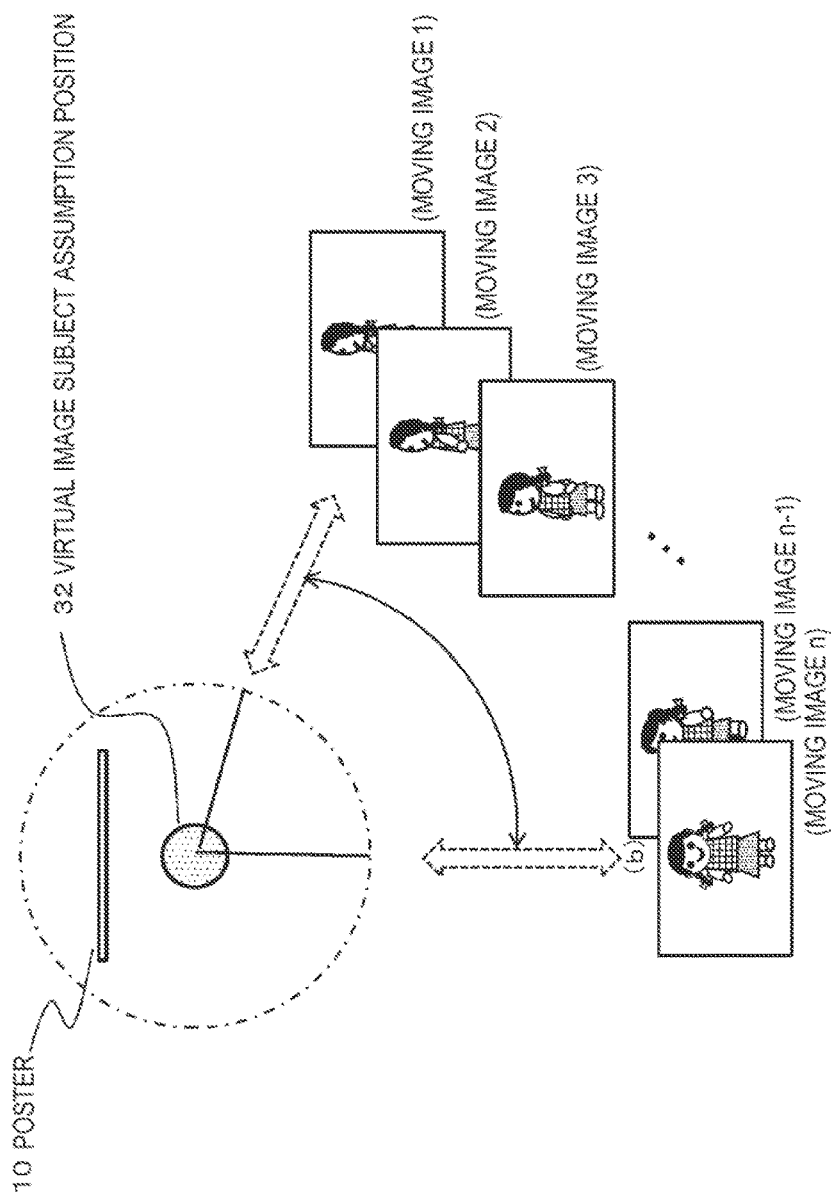
FIG. 16 is a diagram describing an example of an image provided from a server to a client in a first embodiment of the present disclosure.

In the first embodiment, the moving image content of a viewpoint of a certain angle range, for example, n moving image contents from the moving image 1 to the moving image n as illustrated in FIG. 16, are transmitted to the client, and the client performs the processing of selecting the content suitable for the angle or the like of the client from the n contents and displaying the selected content.

Figure 17:
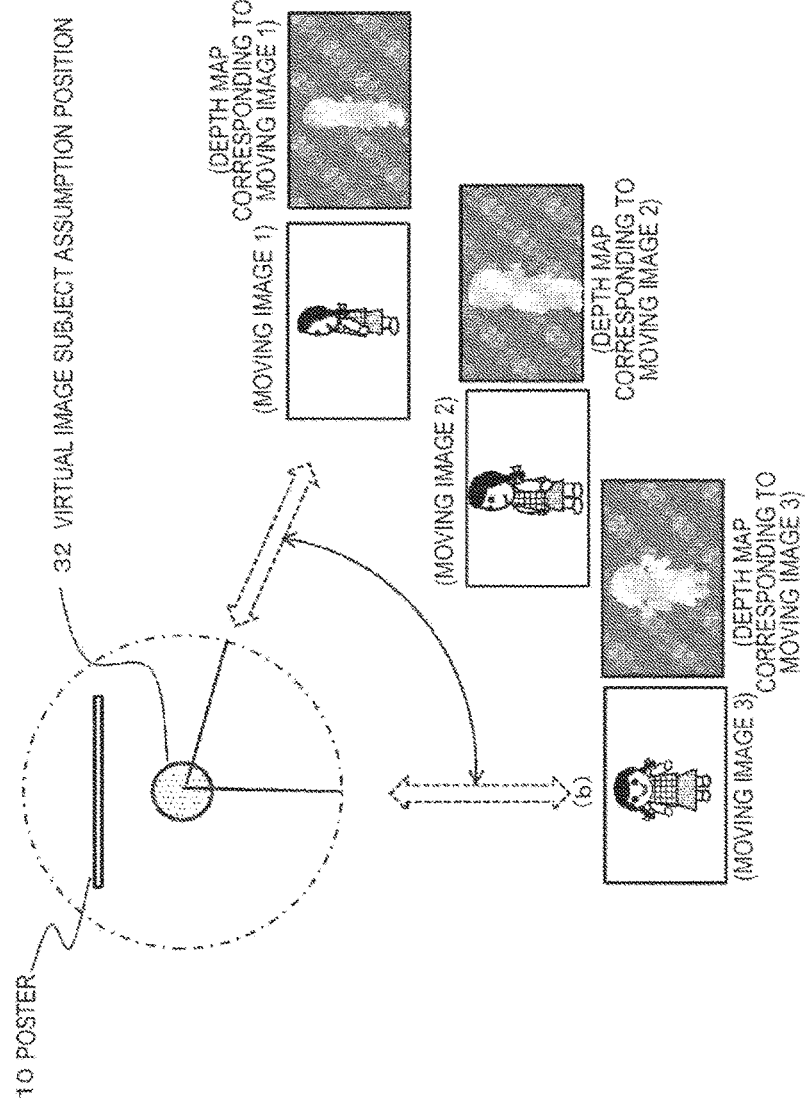
FIG. 17 is a diagram describing an example of an image provided from a server to a client in a second embodiment of the present disclosure.

In the second embodiment described below, as illustrated in FIG. 17, the images of several discrete viewpoints, for example, the moving images of only three viewpoints as described in FIG. 17 among the moving image contents of the multiple viewpoints of a certain angle range, are transmitted to the client. Furthermore, depth information (depth map) corresponding to the three moving images to be transmitted is also transmitted to the client.

The client generates the image of the middle viewpoint from the viewpoint between the moving image 1 and the moving image 2 by applying the images of discrete viewpoints and the depth map, and generates and displays the image to be displayed on the client.

In the configuration of the second embodiment, there is an advantage that can reduce the data amount of the image data to be transmitted from the server to the client.

The processing sequence of the second embodiment will be described with reference to a flowchart illustrated in FIG. 18.

Figure 18:
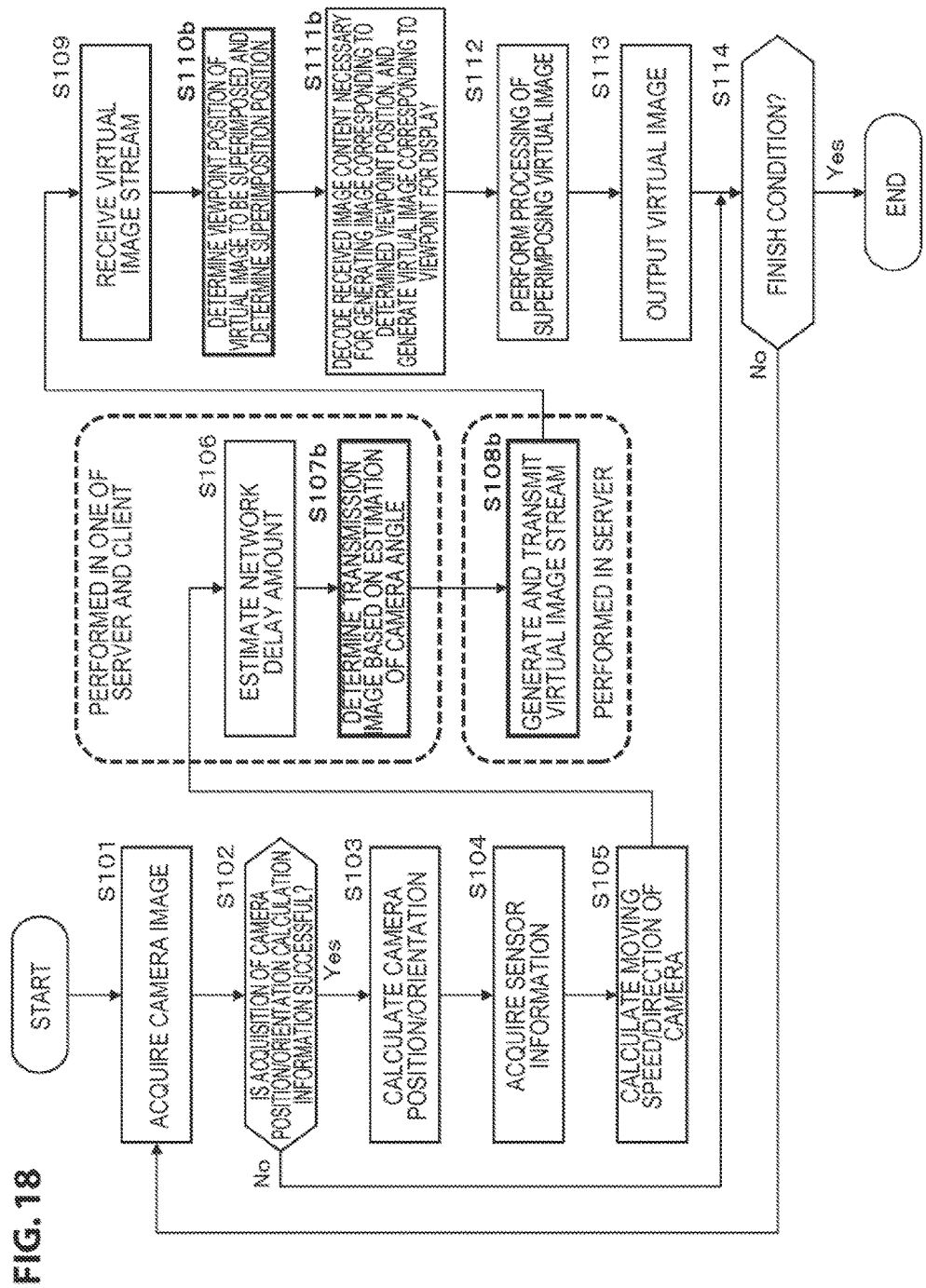
FIG. 18 is a diagram illustrating a flowchart describing a processing sequence of a second embodiment of the present disclosure.

The flow illustrated in FIG. 18 includes the processing common to the flow of FIG. 5 described above as the processing sequence of the first embodiment.

The same processing as embodiment 1 is the processing of steps S101 to S106, the processing of step S109, and the processing of steps S112 to S114.

The processing of step S107b, step S108b, step S110b, and step S111b, which are illustrated in the flow of FIG. 18, is different from the processing of embodiment 1.

Hereinafter, the processing common to embodiment 1 will be briefly described, and different parts will be mainly described.

Incidentally, similarly to embodiment 1, the flow illustrated in FIG. 18 is a flow including the processing of the client that performs the processing of displaying the AR image in which the virtual image is superimposed on the captured image, and the processing of the server that provides the virtual image.

The processing of steps S101 to S105 is process that is performed by the client, the processing of steps S106 and S107 is process that is performed by one of the server and the client, the processing of step S108 is process that is performed by the server, and the processing of steps S109 to S114 is process that is performed by the client.

Incidentally, the processing illustrated in the flow is performed under the control of the data processing section of the server or the client, that is, the data processing section having a CPU or the like with the program execution function, according to the program stored in, for example, the storage section of the server or the client.

Hereinafter, details of the processing of the respective steps will be sequentially described.

(Step S101)

First, in step S101, the client captures an image. For example, the poster as illustrated in FIG. 1 is captured.

(Step S102)

Subsequently, in step S102, the client determines whether information acquisition for calculating position and angle information of the camera, which is necessary at a later stage, is successful.

An example of the information for calculating the position and angle information of the camera is a marker included in the captured image. The marker is a two-dimensional bar code such as, for example, a cyber-code printed in advance on the poster 10 illustrated in FIG. 1.

(Step S103)

Subsequently, in step S103, the client calculates a current position and orientation of the client (camera) by applying the information acquired in step S102.

(Step S104)

Subsequently, in step S104, the client acquires output values of an acceleration sensor and a gyro sensor provided in the client.

(Step S105)

Subsequently, in step S105, the client calculates a moving speed and a moving direction of the client (camera).

This processing is performed by applying, for example, the current position and orientation of the client (camera), which is calculated in step S103, and the sensor information, which is acquired in step S104.

A specific processing example of step S105 is the same as described above with reference to FIG. 6.

(Step S106)

The processing of steps S106 and S107b is process that is performed by one of the client and the server.

In step S106, for example, a ping command is transmitted and received between the client and the server, and a round trip time (RTT) is calculated.

(Step S107b)

Subsequently, the capturing angle of the client (camera) after a predetermined time is estimated based on the moving direction and speed of the client (camera) calculated in step S105 and the network delay time calculated in step S106, an angle range of the virtual image content to be transmitted to the client is set, and the transmission image is determined.

Similarly to embodiment 1 described above, the processing of step S107b is performed by processing of steps S201 to S203 of the flow illustrated in FIG. 7.

As the result, for example, the image of the viewpoint of the angle range to be transmitted and that probability, which are illustrated in FIG. 12, that is, the probability that the client will be set to the position of the image of that viewpoint, are calculated.

In the present embodiment, furthermore, instead of all of such images, only the image of the discrete viewpoint is set as the image to be transmitted to the client.

Specifically, for example, the combination of the images of both ends of the viewpoint angle range calculated as described with reference to FIG. 17 and the image of the viewpoint closest to the client position estimated in step S201 of FIG. 7, that is, the viewpoint of the client (camera) at the time T+Δt.

(Step S108b)

The server generates the image data stream in which the transmission image data determined in the processing of step S107b and the depth map are combined.

A stream generation example will be described with reference to FIG. 19 and thereafter.

FIG. 19(A) is probability distribution data corresponding to the viewpoint calculated according to the flow illustrated in FIG. 7.

By using this data, the image of the discrete viewpoint to be transmitted to the client is selected and transmitted to the client.

FIG. 19(B) is an example of the transmission image data.

(View 1) being the image of the viewpoint at the time T+Δt, and (View 2) and (View 3) being the images of the viewpoints at the positions spaced a predetermined angle apart are transmitted as high-resolution images.

Furthermore, the images (View 4) to (View 7) corresponding to the angles of the viewpoints spaced apart from (View 1) being the image of the viewpoint at the time T+Δt are transmitted as low-resolution images.

Incidentally, depth information (depth map) corresponding to the respective images is also transmitted to the client.

When the server selects the image of the middle viewpoint between (View 1) and (View 2) as the display image, the client generates and displays the image of the middle viewpoint by using the images of the (View 1) and (View 2) and the depth map of each image.

Even when the image of the middle viewpoint with respect to each image is needed, the same processing is performed.

Figure 20:
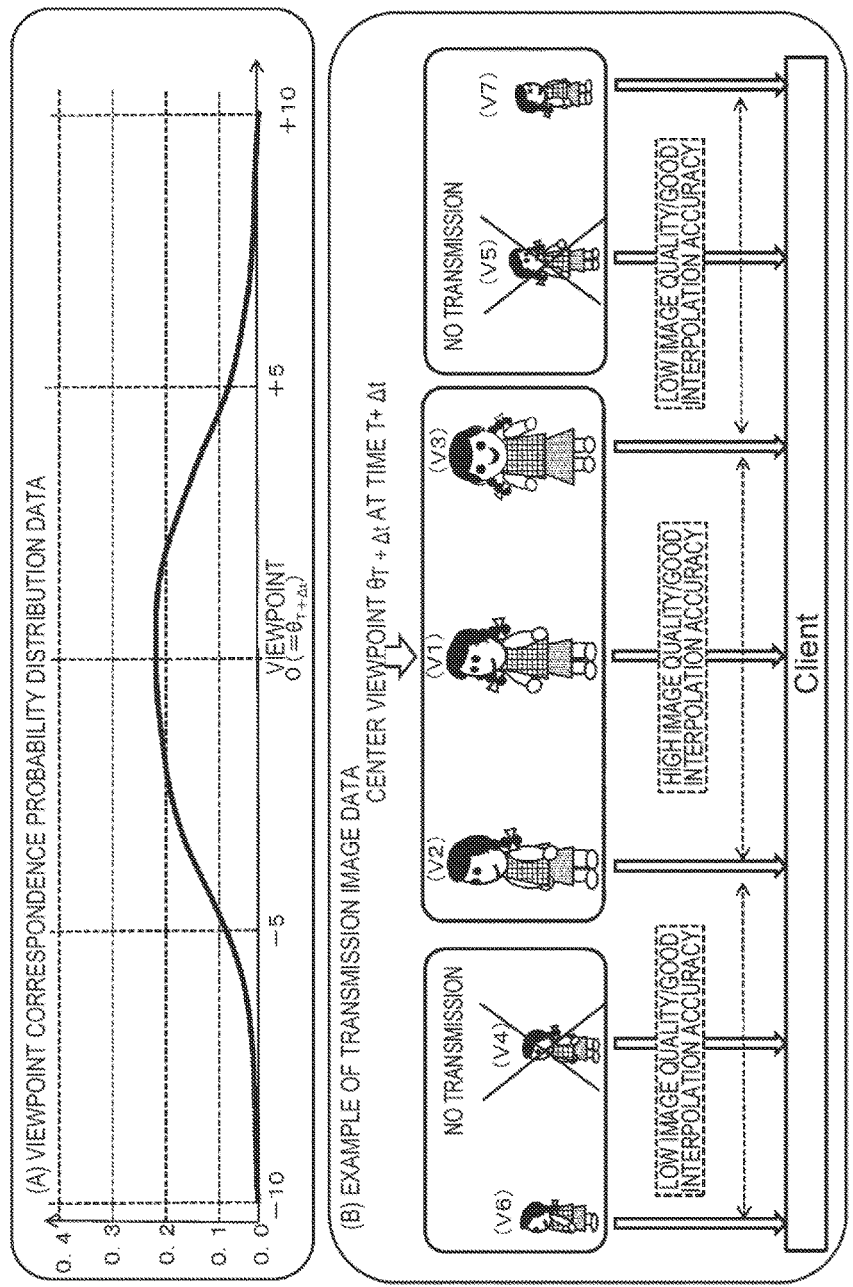
FIG. 20 is a diagram describing an example of transmission data to a client.

The example illustrated in FIG. 20 is also a processing example in which the transmission image is reduced.

Similarly to FIG. 19(A), FIG. 20(A) is probability distribution data corresponding to the viewpoint calculated according to the flow illustrated in FIG. 7.

By using this data, the image of the discrete viewpoint to be transmitted to the client is selected and transmitted to the client.

FIG. 20(B) is an example of the transmission image data.

In the example illustrated in FIG. 20, (View 1) being the image of the viewpoint at the time T+Δt, and (View 2) and (View 3) being the images of the viewpoints at the positions spaced a predetermined angle apart are transmitted as high-resolution images.

Furthermore, among the images (View 4) to (View 7) corresponding to the angles of the viewpoints spaced apart from (View 1) being the image of the viewpoint at the time T+Δt, only (View 6) and (View 7) of both ends are transmitted as low-resolution images, and (View 4) and (View 5) are not transmitted.

When the server selects the image of the middle viewpoint between (View 2) and (View 6) as the display image, the client generates and displays the image of the middle viewpoint by using the images of the (View 2) and (View 6) and the depth map of each image.

Even when the image of the middle viewpoint with respect to each image is needed, the same processing is performed.

Furthermore, for example, as illustrated in FIG. 21(A), when the probability distribution is provided such that the probability of the position of (View 1) being the image of the viewpoint at the time T+Δt is extremely high and the probability at the adjacent angle away is low, the transmission of the image of the angle away may not be set.

That is, as illustrated in FIG. 21(B), only (View 1) being the image of the viewpoint at the time T+Δt, and (View 2) and (View 3) being the images of the viewpoints at the positions spaced a predetermined angle apart are transmitted as high-resolution images.

In step S108b of the flow of FIG. 18, the transmission image stream is generated in such various settings and is transmitted to the client.

In the present embodiment, the image of the discrete viewpoint is selected and transmitted together with the depth map, and the image of the middle viewpoint is displayed on the client side as needed.

(Step S109)

Returning to the flow of FIG. 18, the description about the processing sequence of embodiment 2 will be continued.

When the image transmission is performed by the server in step S108b, the client receives the image stream of the virtual image in step S109.

Figure 21:
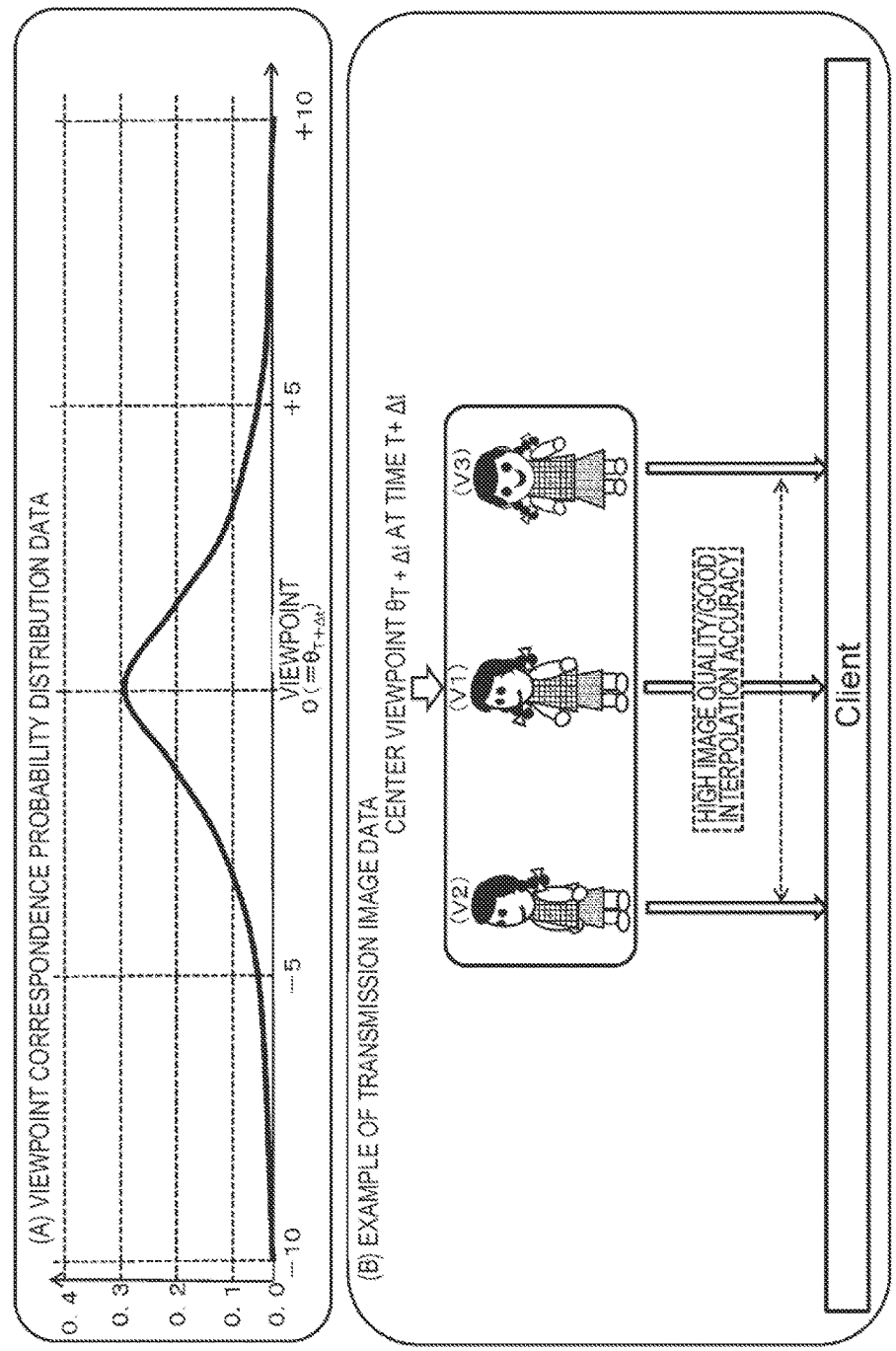
FIG. 21 is a diagram describing an example of transmission data to a client.

For example, the image stream is a stream made up of moving image data of the images of multiple viewpoints and the depth map described with reference to FIGS. 19 to 21.

(Step S110b)

Subsequently, the client calculates the camera position and angle upon reception of the stream, determines the viewpoint position of the virtual image to be displayed on the display section of the client, and determines the superimposition position of the virtual image corresponding to the determined viewpoint. The processing of calculating the camera position and angle is the same processing of steps S102 and S103 as described above and determines the viewpoint position and the superimposition position of the virtual image by applying the calculation result.

(Step S111b)

Subsequently, in step S111b, the client performs the decoding processing on the image stream necessary for generating the image corresponding to the determined viewpoint position.

For example, when the image illustrated in FIG. 20(B) is received and the image of the middle viewpoint between (View 3) and (View 7) is determined as the display image, the images of (View 3) and (View 7) are decoded, and the image of the middle viewpoint is generated by applying the depth map of these images.

(Step S112)

Subsequently, in step S112, the client superimposes the generated image content on the captured camera image that is displayed on the display section of the client.

(Step S113)

Subsequently, in step S113, the client outputs an AR image in which the virtual image is superimposed on the captured image as the final result on the display section (display) of the client.

(Step S114)

In step S114, it is determined whether a predetermined finish condition, such as the finish of the image capture processing or the finish of the application, occurs, and non-processing is ended when the finish condition occurs. When the finish condition does not occur, the processing returns to step S101 and the same processing is repeated.

In this way, the virtual image transmitted from the server is superimposedly displayed on the captured image that is displayed on the display section of the client.

Figure 22:
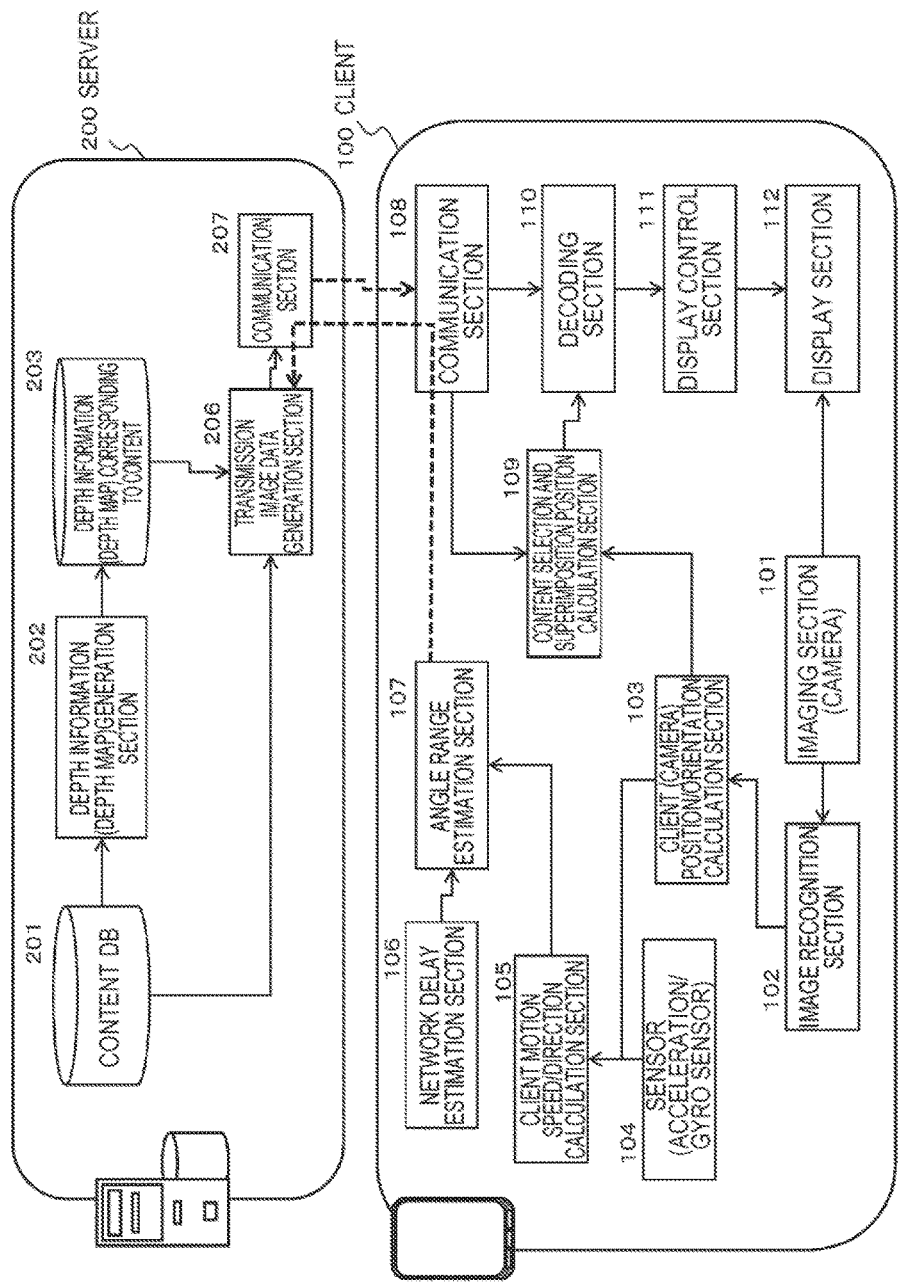
FIG. 22 is a diagram describing a configuration example of a server and a client in a second embodiment of the present disclosure.

FIG. 22 illustrates a configuration example of the server 200 and the client 100 that perform the present embodiment 2.

Data transmission and reception is performed between a communication section 108 of the client 100 and a communication section 207 of the server 200.

Incidentally, in FIG. 22, a network delay estimation section 106 and an angle range estimation section 107, which are illustrated in the configuration of the client 100, may be set as elements of the server 200, instead of the client 100.

The client 100 and the server 200, which are illustrated in FIG. 22, perform the above-described processing according to the flow illustrated above in FIG. 19.

The processing, which is performed by the respective sections illustrated in FIG. 22, will be described in association with the processing of the respective steps of the flow of FIG. 19.

Figure 19:
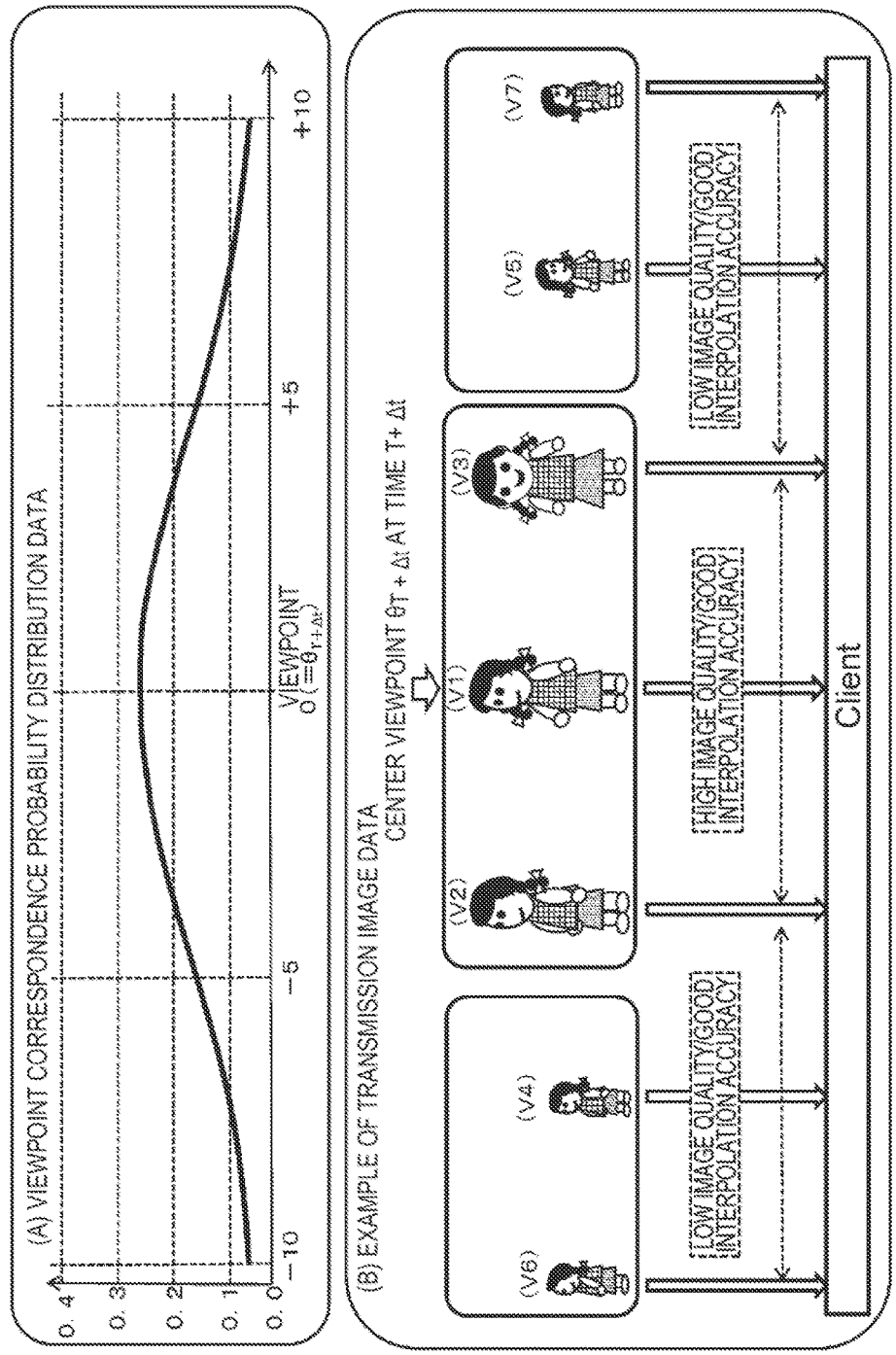
FIG. 19 is a diagram describing an example of transmission data to a client.

An imaging section (camera) 101 of the client 100 performs the camera image acquisition processing of step S101 of the flow illustrated in FIG. 19.

An image recognition section 102 performs the camera position/orientation calculation information acquisition processing of step S102 of the flow of FIG. 19. Specifically, for example, the processing of recognizing the marker set to the subject such as the poster illustrated in FIG. 1 is performed.

A client (camera) position/orientation calculation section 103 performs the camera position/orientation calculation processing of step S103 of the flow of FIG. 19.

A sensor (acceleration/gyro sensor) 104 performs the sensor information acquisition processing of step S104 of the flow of FIG. 19.

A client moving speed/direction calculation section 105 performs the client (camera) moving speed/direction calculation processing of step S105 of the flow of FIG. 19.

A network delay estimation section 106 performs the network delay estimation processing of step S106 of the flow of FIG. 19.

An angle range estimation section 107 performs the processing of step S107b of the flow of FIG. 19, that is, the transmission image determination processing and the probability estimation processing, based on the client (camera) position estimation.

Incidentally, the network delay estimation section 106 and the angle range estimation section 107 may be set to the server 200 side and performed as the processing of the server 200.

The angle range estimation section 107 determines the transmission image based on the client (camera) position estimation and calculates the probability corresponding to each transmission image, that is, the probability that the client will be set to the viewpoint position corresponding to each image. Specifically, for example, the data described above with reference to FIG. 12 is generated.

The data is input to a transmission image data generation section 206 of the server 200 through a communication section.

The server 200 holds the image content (moving image stream) of discrete multiple viewpoints to be provided to the client in a content database 201.

In the server, as pre-processing, a depth information generation section 202 acquires content stored in a content database 201, that is, image content of discrete multiple viewpoints, and generates depth information (depth map) 203 corresponding to the image.

The transmission image data generation section 206 of the server 200 performs the processing of generating the transmission stream from the content 205 corresponding to each viewpoint, based on the image content to be transmitted to the client. That is, the process of step S108b of the flow illustrated in FIG. 19 is performed.

For example, as described above with reference to FIGS. 19 to 21, the server sets the data, in which the images of discrete multiple viewpoints and the depth map are combined, as the data to be provided to the client.

The transmission data generated by the transmission image data generation section 206 is transmitted to the communication section 108 of the client 100 through the communication section 207.

The communication section 108 of the client 100 performs the virtual image stream reception processing of step S109 of the flow of FIG. 19.

A content selection and superimposition position calculation section 109 of the client 100 performs the processing of step S110b of the flow of FIG. 19, that is, the processing of determining the viewpoint position of the virtual image to be displayed and the superimposition position. That is, the camera position and angle are calculated upon reception of the stream, the viewpoint position of the virtual image to be displayed on the display section of the client is determined, and the superimposition position of the determined virtual image is determined.

A decoding section 110 performs the processing of step S111 of the flow of FIG. 19, that is, the processing of decoding the image stream necessary for generating the image corresponding to the determined viewpoint position.

For example, when the image illustrated in FIG. 20(B) is received and the image of the middle viewpoint between (View 3) and (View 7) is determined as the display image, the images of (View 3) and (View 7) are decoded, and the image of the middle viewpoint is generated by applying the depth map of these images.

A display control section 111 performs the processing of steps S112 and S113 of the flow of FIG. 19, that is, outputs an AR image in which the decoded content is superimposed on the captured camera image that is displayed on the display section 112 of the client 100.

In this way, the virtual image transmitted from the server is superimposedly displayed on the captured image that is displayed on the display section of the client.

The processing of the second embodiment has the following advantages.

(Advantage 1) The bandwidth of the network can be reduced. Alternatively, the image quality is improved while maintaining the bandwidth.

This is because it is better to the image in which the number of viewpoints to be transmitted is at least two viewpoints.

(Advantage 2) It is more robust to the abrupt motion of the client terminal. In the stream to be transmitted, only the view of both ends can be transmitted by skipping the original video in the middle of the viewpoint with low probability. In the interval of the viewpoint with low probability, the number of the streams to be transmitted can be reduced by increasing a parallax between viewpoints to be interpolated. Therefore, as compared with embodiment 1, it is easy to widen the angle range that can be transmitted.

4. Third Embodiment of Present Disclosure

Next, a third embodiment of the present disclosure will be described.

The third embodiment is an embodiment in which the first embodiment and the second embodiment described above are combined.

In the first embodiment, the moving image content of a viewpoint of a certain angle range, for example, n moving image contents from the moving image 1 to the moving image n in FIG. 16, is transmitted to the client, and the client performs the processing of selecting the content suitable for the angle or the like of the client from the n contents and displaying the selected content.

In the second embodiment, as illustrated in FIG. 17, the images of several discrete viewpoints, for example, the moving images of only three viewpoints as described in FIG. 17 among the moving image contents of the multiple viewpoints of a certain angle range, are transmitted to the client. Furthermore, depth information (depth map) corresponding to the three moving images to be transmitted is also transmitted to the client.

In the processing of the first embodiment, a more network band is required and the image quality is relatively low, but the processing in the client is a low load and real-time rendering can be easily performed.

On the other hand, in the processing of the second embodiment, the processing in the client is a high load, real-time rendering is difficult, and a battery is more consumed, but a network band necessary for high image quality is small.

By adaptively switching the two methods, it is possible to realize the configuration that can deliver the moving image further optimal to the situation. The combined method will be described as the third embodiment.

Specifically, the third embodiment performs the processing of switching whether to perform the optimal method having (a) rendering speed and calculation performance of the client and (b) network bandwidth as parameters, that is, one of the processing of the first embodiment and the processing of the second embodiment.

Furthermore, the processing may be set to be switched for each content to be superimposed.

For example, content information of (a) content that requires higher image quality but is good even when the frame rate is lowered and (b) content that requires 30-fps rendering but is good even at low image quality is held as metadata corresponding to the content, and the processing of switching whether to perform the optimal method, that is, one of the processing of the first embodiment and the processing of the second embodiment is performed according to the metadata.

Figure 23:
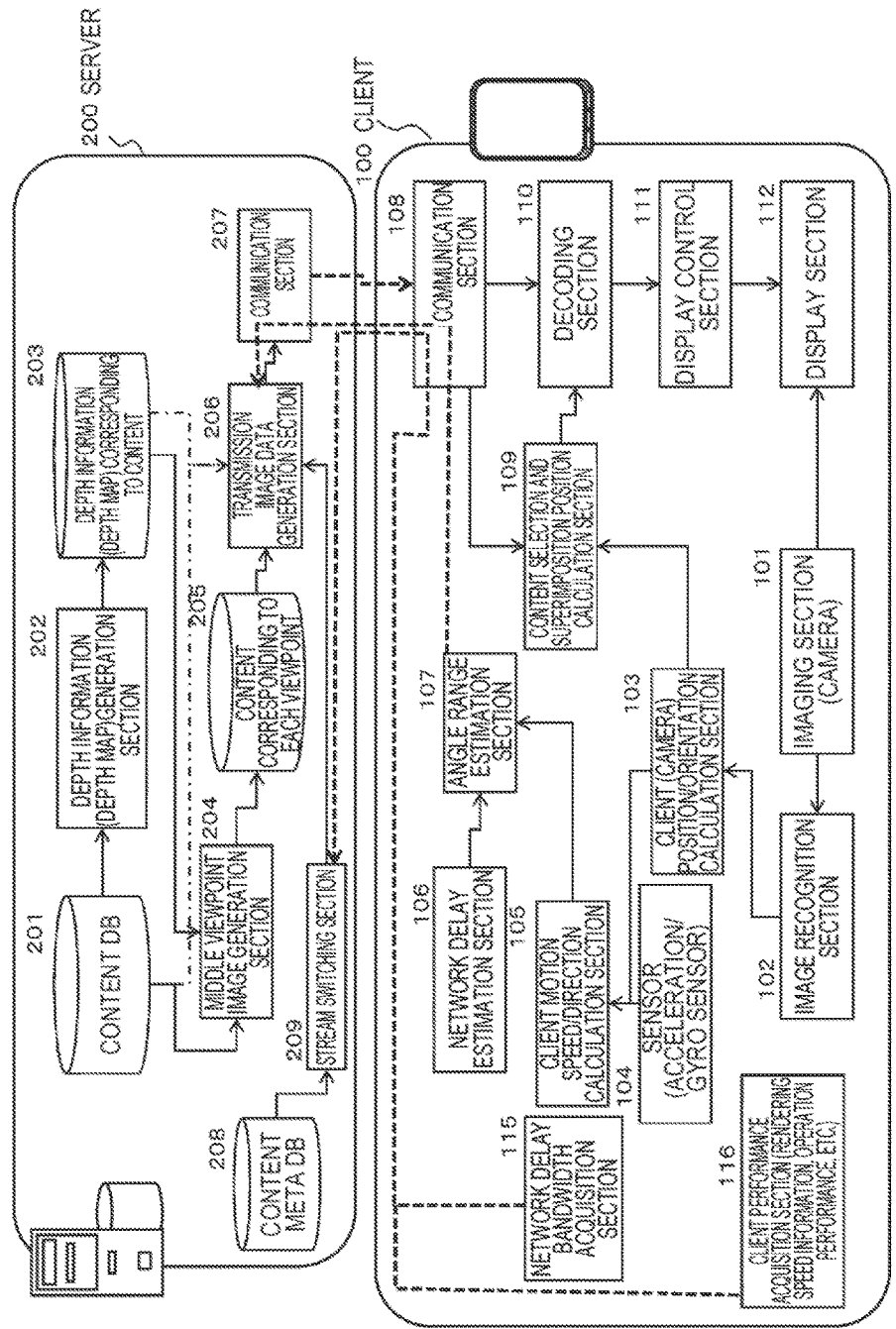
FIG. 23 is a diagram describing a configuration example of a server and a client in a third embodiment of the present disclosure.

FIG. 23 illustrates a configuration example of the server 200 and the client 100 that perform the processing of the third embodiment.

The configuration illustrated in FIG. 23 is a configuration in which the following elements are added to the configuration illustrated above in FIG. 15 described as the server/client configuration of embodiment 1.

A network delay bandwidth acquisition section 115 and a client performance acquisition section 116 of the client 100, and a content meta database 208 and a stream switching section 209 of the server 200 are added.

Incidentally, the network delay bandwidth acquisition section 115 of the client 100 may be set on the server 200 side.

The network delay bandwidth acquisition section 115 of the client 100 measures the bandwidth of the communication network between the server and the client.

The client performance acquisition section 116 of the client 100 identifies the rendering speed performance and the operation performance of the client.

The measured data or the identified data are notified to the stream switching section 209 of the server 200.

The stream switching section 209 of the server 200 performs the processing of switching whether to perform the optimal method according to input information, that is, one of the processing of the first embodiment and the processing of the second embodiment.

Also, the content meta database 208 stores metadata corresponding to content, for example, metadata corresponding to (a) content that requires high image quality but is good even when the frame rate is lowered and (b) content that requires 30-fps rendering but is good even at low image quality.

The stream switching section 209 of the server 200 acquires metadata corresponding to transmission content from the content meta database 208 and performs the processing of switching whether to perform the optimal method according to the metadata, that is, one of the processing of the first embodiment and the processing of the second embodiment.

The processing of the remaining configuration is the same processing as described in embodiment 1 and embodiment 2.

The present embodiment realizes the configuration that can deliver the moving image optimal to the situation by adaptively switching the processing described as the first embodiment and the processing described as the second embodiment according to the performance of the client, the available bandwidth in the network, or the metadata as the content information.

5. Other Embodiments (a) Configuration Using No Server

In the respective embodiments described above, the embodiment in which the virtual image is held by the server and is provided from the server to the client has been described.

However, the content made up of the virtual image or the virtual image depth map may be stored in a media of the client, for example, a disk-type media such as a hard disk, a DVD, or a BD, or a storage section such as a flash memory, and the client data processing section may read the content from the storage section, select the virtual image corresponding to the viewpoint or generate the virtual image by applying the depth map, and display the virtual image on the display section of the client.

In this case, the processing of the server side in the foregoing embodiment is all performed in the client.

Also, the network delay described in the foregoing embodiment need not be considered, and the processing of measuring the network delay or the setting of the angle range considering the network delay is not required.

(b) Configuration that Reduces the Processing of the Client

Furthermore, as the configuration that reduces the processing of the client, for example, in the flowchart illustrated in FIG. 5 described as the processing sequence of the first embodiment, the client may perform only the image acquisition processing of step S101 and the processing of steps S113 and S114 and the server may perform the remaining processing.

Similarly, in the flowchart illustrated in FIG. 18 described as the processing sequence of the second embodiment, the client may perform only the image acquisition processing of step S101 and the processing of steps S113 and S114 and the server may perform the remaining processing.

That is, the client transmits the image captured in the client to the server, and the server performs the processing of steps S102 to S112 based on the transmission image. The server transmits only the image of one viewpoint to be displayed in the client to the client, and the client superimposedly displays the received image on the captured image.

This processing configuration greatly reduces the processing load of the client.

6. Summary of Configuration of Present Disclosure

The embodiments of the present disclosure have been described in detail with reference to specific embodiments. However, it is obvious that modifications or substitutions of the embodiments can be made by those skilled in the art, without departing from the scope of the present disclosure. That is, the present invention is disclosed in the form of examples and should not be construed as limited thereto. The scope of the present disclosure should be determined with reference to the appended claims.

Additionally, the present technology may also be configured as below.

(1)
An information processing device including:
an acquisition section configured to acquire space position information of a terminal including a display section that displays an image in which a virtual image is superimposed on a captured image acquired by an imaging section; and
a specifying section configured to specify display information for displaying the virtual image on the display section according to the space position information of the terminal.

(2)
The information processing device according to (1), further including;
an imaging section configured to capture an image;
a display section configured to display a captured image of the imaging section; and
a data processing section configured to receive the virtual image from a server and superimposedly display the received virtual image on the captured image displayed on the display section,
wherein the data processing section estimates the position of the imaging section after predetermined time according to motion information of the information processing device, transmits the estimated position information to the server, receives the virtual image captured from the estimated position from the server, and displays the received image or the image generated based on the received image on the display section.

(3)
The information processing device according to (2),
wherein the data processing section estimates the capturing direction of the imaging section after time T+Δt considering network delay time Δt that is round trip time of a communication with a server by applying position/orientation information of the imaging section and motion information at current time T, and transmits the estimated direction to the server as the estimated position information.

(4)
The information processing device according to any one of (1) to (3),
wherein the data processing section calculates probability of the capturing direction of the imaging section after time T+Δt considering network delay time Δt that is round trip time of a communication with a server by applying position/orientation information of the imaging section and motion information at current time T, selects an angle range of a range with high probability, and receives, form the server, virtual images of multiple viewpoints included in the selected angle range or the depth map and the image for virtual image generation.

(5)
The information processing device according to (4),
wherein the data processing section receives, from the server, image data in which an image with a relatively high probability is set as a high-resolution image and an image with a relatively low probability is set as a low-resolution image in the selected angle range.

(6)
The information processing device according to (4),
wherein, when there is no great difference in the probability in the selected angle range, the data processing section receives, from the server, the virtual images of the multiple viewpoints included in the selected angle range as images having a same resolution.

(7)
The information processing device according to any one of (4) to (7),
wherein the data processing section selects a virtual image of a viewpoint close to the capturing direction of the imaging section at a display timing of the virtual image from the virtual images of the multiple viewpoints received from the server, or generates a virtual image captured from a viewpoint close to the capturing direction of the imaging section at the display timing of the virtual image by applying the depth map and the image for virtual image generation, and displays the virtual image on the display section.

(8)

An information processing device as a server including:

a communication section configured to perform communication with a client; and a data processing section configured to select and transmit a virtual image to be superimposedly displayed on a captured image of a client imaging section which is displayed on a display section of the client, wherein the data processing section selects a virtual image captured from the position of the client capturing section after predetermined time estimated according to the motion information of the client or a depth map and an image for virtual image generation as data to be transmitted to the client, and transmits the selected virtual image or the depth map and the image to the client.

(9)

The information processing device according to (8), wherein the data processing section estimates the capturing direction of the client imaging section after time T+Δt considering network delay time Δt that is round trip time of a communication between the server and the client by applying position/orientation information of the client imaging section and motion information at current time T, and selects the virtual image captured in the estimated direction or the depth map and the image for virtual image generation as data to be transmitted to the client.

(10)

The information processing device according to (8) or (9), wherein the data processing section calculates probability of the capturing direction of the client imaging section after time T+Δt considering network delay time Δt that is round trip time of a communication between the server and the client by applying position/orientation information of the client imaging section and motion information at current time T, selects an angle range of a range with high probability, and selects the virtual images of the multiple viewpoints included in the selected angle range as data to be transmitted to the client.

(11)

The information processing device according to (10), wherein the data processing section generates image data to be transmitted in which an image with a relatively high probability is set as a high-resolution image and an image with a relatively low probability is set as a low-resolution image in the selected angle range, and transmits the image data to the client.

(12)

An information processing device including:

an imaging section configured to capture an image;

a display section configured to display a captured image of the imaging section;

a storage section configured to store virtual images corresponding to multiple viewpoints that are virtual images to be superimposedly displayed on a captured image displayed on the display section and are obtained by capturing an object from different multiple viewpoints; and a data processing section configured to acquire the virtual image from the storage section and superimposedly display the acquired virtual image on the captured image displayed on the display section, wherein the data processing section estimates the position of the imaging section after predetermined time according to motion information of the information processing device, and then selects the virtual image captured from the estimated position from the storage unit and displays the virtual image, or generates the virtual image based on the virtual image acquired from the storage section and displays the virtual image on the display section.

(13)

The information processing device according to (12), wherein the storage section stores the depth map and the virtual image corresponding to multiple viewpoints obtained by capturing an object from different multiple viewpoints, and wherein the data processing section generates and displays the virtual image captured from the estimated position on the display section by applying the depth map and the virtual image acquired from the storage section.

(14)

The information processing device according to (12) or (13), wherein the data processing section calculates probability of the capturing direction of the imaging section after predetermined time according to motion information of the information processing device, selects a virtual image with a high probability from the storage section or generates a virtual image based on the virtual image acquired from the storage section, and displays the virtual image on the display section.

Further, a method of processing performed in the above apparatus and system and a program to execute the processing are included in the configuration of the present disclosure.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

INDUSTRIAL APPLICABILITY

As described above, according to the configuration of one embodiment of the present disclosure, the virtual image, which is natural according to the capturing direction of the camera, can be superimposedly displayed on the captured camera image displayed on the display section.

Specifically, the configuration includes the server that transmits the virtual image to the client, and the client that superimposedly displays the captured camera image and the virtual image transmitted from the server. The server transmits, to the client, the virtual image captured from the client position after a predetermined time estimated according to the motion of the client (camera). In one of the server and the client, by applying the client position/orientation information at the current time T and the motion information, the capturing direction of the client after the time T+Δt considering the network delay time Δt that is the round trip time of communication between the server and the client is estimated, and the virtual image captured in the estimated direction is transmitted to the client.

According to such configurations, the virtual image, which is natural according to the capturing direction of the camera, can be superimposedly displayed on the captured camera image displayed on the display section of the client.

REFERENCE SIGNS LIST 10 poster
11 marker
21, 22 user
30 client (portable terminal)
31 virtual image
100 client
101 imaging section (camera)
102 image recognition section
103 client (camera) position/orientation calculation section
104 sensor (acceleration/gyro sensor)
105 client motion speed/direction calculation section
106 network delay estimation section
107 angle range estimation section
108 communication section
109 content selection and superimposition position calculation section
110 decoding section
111 display control section
112 display section
115 network delay bandwidth acquisition section
116 client performance acquisition section
200 server
201 content database
202 depth information (depth map) generation section
203 content correspondence depth information (depth map)
204 middle viewpoint image generation section
205 content according to each viewpoint
206 transmission image data generation section
207 communication section
208 content meta database
209 stream switching section

The invention claimed is:

1. An information processing device comprising:
an imager configured to capture an image:
a sensor configured to acquire motion information of the imager: and
a display configured to display an image in which a virtual image is superimposed on the captured image,
wherein the virtual image is received from a server,
wherein the virtual image is displayed according to space position information of the imager,
wherein the information processing device generates an estimated position of the imager after a predetermined time according to the motion information of the information processing device, transmits the estimated position information to the server, receives the virtual image captured from the estimated position or a depth map and an image for virtual image generation from the server, and displays the received virtual image captured or an image generated based on the depth map and the image for virtual image generation from the server, and wherein the information processing device calculates a probability of a capturing direction of the imager after time T+Δt considering network delay time Δt that is round trip time of a communication with the server by applying position/orientation information of the imager and motion information at current time T, selects an angle range of a range with high probability, and receives, form the server, virtual images of multiple viewpoints included in the selected angle range or the depth map and the image for virtual image generation.

2. The information processing device according to claim 1, wherein the information processing device, from the server, image data in which an image with a relatively high probability is set as a high-resolution image and an image with a relatively low probability is set as a low-resolution image in the selected angle range.

3. The information processing device according to claim 1, wherein, when there is no great difference in the probability in the selected angle range, the information processing device receives, from the server, the virtual images of the multiple viewpoints included in the selected angle range as images having a same resolution.

4. The information processing device according to claim 1, wherein the information processing device selects the virtual image of a viewpoint close to the capturing direction of the imager at a display timing of the virtual image from the virtual images of the multiple viewpoints received from the server, or generates a virtual image captured from a viewpoint close to the capturing direction of the imager at the display timing of the virtual image by applying the depth map and the image for virtual image generation, and displays the virtual image on the display.

5. An information processing device as server comprising:
a communication interface configured to perform communication with a client; and
a data processor configured to select a virtual image to be superimposedly displayed on a captured image of a client imager,
wherein the data processor selects the virtual image captured from the position of the client imager after predetermined time estimated according to motion information of the client or a depth map and an image for virtual image generation as data to be transmitted to the client, and the information processing device transmits to the client the virtual image captured or the depth map and the image for virtual image generation, and
wherein the information processing device calculates a probability of a capturing direction of the client imager after time T+Δt considering network delay time Δt that is round trip time of a communication between the server and the client by applying position/orientation information of the client imager and motion information at current time T, selects an angle range of a range with high probability, and selects the virtual images of multiple viewpoints included in the selected angle range as data to be transmitted to the client.

6. The information processing device according to claim 5, wherein the information processing device generates image data to be transmitted in which an image with a relatively high probability is set as a high-resolution image and an image with a relatively low probability is set as a low-resolution image in the selected angle range, and transmits the image data to the client.

7. An information processing device comprising:
an imager configured to capture an image:
a display configured to display the captured image of the imager: and a storage configured to store virtual images corresponding to multiple viewpoints that are virtual images to be superimposedly displayed on the captured image displayed on the display and the virtual images are obtained by capturing an object from different multiple viewpoints, wherein the information processing device is configured to acquire a virtual image from the storage and superimposedly display the acquired virtual image on the captured image displayed on the display, wherein the information processing device generates an estimated position of the imager after a predetermined time according to motion information of the information processing device, and then selects the virtual image captured from the estimated position from the storage and displays the virtual image, or generates the virtual image based on the virtual image acquired from the storage and displays the virtual image on the display, and wherein the image processing device calculates a probability of a capturing direction of the imager after the predetermined time according to motion information of the information processing device, selects the virtual image with a high probability from the storage section or generates the virtual image based on the virtual image acquired from the storage section, and displays the virtual image on the display section.

* * * * *